United States Patent
Moon et al.

(10) Patent No.: US 10,524,247 B2
(45) Date of Patent: Dec. 31, 2019

(54) APPARATUS AND METHOD FOR MULTIPLEXING DATA IN WIRELESS COMMUNICATION SYSTEM

(71) Applicants: Samsung Electronics Co., Ltd., Suwon-si, Gyeonggi-do (KR); Korea Advanced Institute of Science and Technology, Daejeon (KR)

(72) Inventors: Jung-min Moon, Suwon-si (KR); Minhoe Kim, Daejeon (KR); Dong Seok Roh, Daegu (KR); Dong-Ho Cho, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1 day.

(21) Appl. No.: 15/896,672

(22) Filed: Feb. 14, 2018

(65) Prior Publication Data

US 2018/0242291 A1    Aug. 23, 2018

(30) Foreign Application Priority Data

Feb. 17, 2017 (KR) .................. 10-2017-0021783

(51) Int. Cl.
*H04W 72/04* (2009.01)
*H04L 5/00* (2006.01)
(Continued)

(52) U.S. Cl.
CPC ......... *H04W 72/042* (2013.01); *H04L 1/1854* (2013.01); *H04L 1/1896* (2013.01);
(Continued)

(58) Field of Classification Search
None
See application file for complete search history.

(56) References Cited

U.S. PATENT DOCUMENTS

| 2010/0040005 A1* | 2/2010 | Kim | .............. | H04W 72/1284 |
| | | | | 370/329 |
| 2012/0147793 A1* | 6/2012 | Chen | .................. | H04W 16/14 |
| | | | | 370/280 |

(Continued)

OTHER PUBLICATIONS

"On multiplexing between eMBB and URLLC", LG Electronics, 3GPP TSG RAN WG1 Meeting #87 R1-1611849 Reno, USA, Nov. 14-18, 2016.

(Continued)

*Primary Examiner* — Eunsook Choi
(74) *Attorney, Agent, or Firm* — Jefferson IP Law, LLP

(57) ABSTRACT

The present disclosure relates to a pre-5$^{th}$-Generation (5G) or 5G communication system to be provided for supporting higher data rates Beyond 4$^{th}$-Generation (4G) communication system such as Long Term Evolution (LTE). A terminal apparatus in a wireless communication system is provided. The terminal apparatus includes a transceiver configured to transmit and receive a signal, and at least one processor configured to be functionally combined with the transceiver, control the transceiver to transmit a scheduling request (SR) signal by using a pre-allocated resource from a base station, and control the transceiver to transmit uplink (UL) data for a first service by using a resource punctured in a downlink (DL) subframe for a second service, and the pre-allocated resource includes a resource allocated in the DL subframe for the second service.

17 Claims, 29 Drawing Sheets

(51) Int. Cl.
*H04W 72/14* (2009.01)
*H04L 1/18* (2006.01)
*H04W 72/12* (2009.01)
H04W 74/08 (2009.01)
H04L 5/14 (2006.01)

(52) U.S. Cl.
CPC .......... *H04L 5/0055* (2013.01); *H04L 5/0082* (2013.01); *H04L 5/0094* (2013.01); *H04W 72/0433* (2013.01); *H04W 72/1236* (2013.01); *H04W 72/14* (2013.01); H04L 5/0023 (2013.01); H04L 5/0035 (2013.01); H04L 5/14 (2013.01); H04W 72/0446 (2013.01); H04W 74/0808 (2013.01)

(56) References Cited

U.S. PATENT DOCUMENTS

| 2015/0188650 | A1 | 7/2015 | Au et al. | |
|---|---|---|---|---|
| 2015/0334729 | A1* | 11/2015 | Ji | H04W 72/0453 370/336 |
| 2016/0270045 | A1* | 9/2016 | Mukkavilli | H04W 72/0406 |
| 2018/0206225 | A1* | 7/2018 | Li | H04L 1/1671 |
| 2018/0376497 | A1* | 12/2018 | You | H04L 1/00 |
| 2019/0098608 | A1* | 3/2019 | Yi | H04L 5/0007 |

OTHER PUBLICATIONS

"UL URLLC transmission schemes", Intel Corporation, 3GPP TSG RAN WG1 Meeting #87 R1-1612004 Reno, USA, Nov. 14-18, 2016.
"On HARQ/scheduling timing and self-contained operation", Nokia, Alcatel-Lucent Shanghai Bell, 3GPP TSG-RAN WG1 #87 R1-1612241 Reno, USA, Nov. 14-18, 2016.
"UL URLLC Transmissions", Samsung, 3GPP TSG RAN WG1 #87 R1-1612545 Reno, USA, Nov. 14-18, 2016.
"Carrier Sensing for UL URLLC Transmissions", Samsung, 3GPP TSG RAN WG1 #89 R1-1612546 Reno, USA, Nov. 14-18, 2016.
"Final Report of 3GPP TSG RAN WG1 #86bis v1.0.0", MCC Support, 3GPP TSG RAN WG1 Meeting #87 R1-1611081 Reno, USA, Nov. 14-18, 2016.

* cited by examiner

APPARATUS AND METHOD FOR MULTIPLEXING DATA IN WIRELESS COMMUNICATION SYSTEM

CROSS-REFERENCE TO RELATED APPLICATION(S)

This application is based on and claims priority under 35 U.S.C. § 119(a) of a Korean patent application number 10-2017-0021783, filed on Feb. 17, 2017, in the Korean Intellectual Property Office, the disclosure of which is incorporated by reference herein in its entirety.

JOINT RESEARCH AGREEMENT

The disclosure was made by or on behalf of the below listed parties to a joint research agreement. The joint research agreement was in effect on or before the date the disclosure was made and the disclosure was made as a result of activities undertaken within the scope of the joint research agreement. The parties to the joint research agreement are 1) Samsung Electronics Co., Ltd. and 2) Korea Advanced Institute of Science and Technology.

TECHNICAL FIELD

The disclosure relates to a wireless communication system. More particularly, the disclosure relates to an apparatus and a method for multiplexing data.

BACKGROUND

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The object of the next generation mobile communication system, such as a fifth generation (5G) system is to provide more varied services in comparison to the related art. For example, the next generation mobile communication system is intended to provide an enhanced mobile broadband (eMBB) service providing a high-speed data service, a massive machine type communication (mMTC) service providing connection among various things, such as an internet of things (IoT) service, and an ultra-reliable and low latency communication (URLLC) service for communication that requires urgency, accuracy, and low delay, such as communication in an emergency network or among automatically driven vehicles.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an apparatus and a method for effectively multiplexing data having different transmission time intervals (TTI) in a wireless communication system.

Another aspect of the disclosure is to provide an apparatus and a method for transmitting data having a short TTI in a transmission frame using a normal TTI in a wireless communication system.

Another aspect of the disclosure is to provide an apparatus and a method for transmitting uplink (UL) data for a service using a short TTI in a downlink (DL) subframe configured for a service using a normal TTI in a wireless communication system.

Another aspect of the disclosure is to provide an apparatus and a method for transmitting DL data for a service using a short TTI in an UL subframe configured for a service using a normal TTI in a wireless communication system.

In accordance with an aspect of the disclosure, a method of operating a terminal in a wireless communication system is provided. The method includes transmitting a scheduling request (SR) signal to a base station by using a pre-allocated resource by the base station, and transmitting uplink (UL) data for a first service by using a resource punctured in a DL subframe for a second service, in which the pre-allocated resource includes a resource allocated in the DL subframe for the second service, the first service includes a service that uses a short TTI, and the second service includes a service that uses a normal TTI.

In accordance with another aspect of the disclosure, a method of operating a base station in a wireless communication system is provided. The method includes receiving an SR signal from a terminal by using a pre-allocated resource puncturing a resource for transmitting UL data for a first service in a DL subframe for a second service by means of the terminal, and receiving the UL data for the first service from the terminal by using the resource punctured in the DL subframe for the second service, in which the pre-allocated resource includes a resource allocated in the DL subframe for the second service.

In accordance with another aspect of the disclosure, a terminal apparatus in a wireless communication system is provided. The terminal apparatus includes a transceiver configured to transmit and receive a signal, and a control unit configured to be functionally combined with the transceiver, in which the control unit controls the transceiver to transmit an SR signal by using a pre-allocated resource by a base station and controls the transceiver to transmit UL data for a first service by using a resource punctured in a DL subframe for a second service, and the pre-allocated resource includes a resource allocated in the DL subframe for the second service.

In accordance with another aspect of the disclosure, a base station apparatus in a wireless communication system is provided. The base station apparatus includes a transceiver configured to transmit and receive a signal, and a control unit configured to be functionally combined with the transceiver, in which the control unit controls the transceiver to receive an SR signal from a terminal by using a pre-allocated resource, punctures a resource for the terminal to transmit UL data for a first service in a DL subframe for a second service, and controls the transceiver to receive the UL data for the first service from the terminal by using the resource punctured in the DL subframe for the second service, and the pre-allocated resource includes a resource allocated in the DL subframe for the second service.

In accordance with another aspect of the disclosure, a method of operating a terminal in a wireless communication system is provided. The method includes receiving DL data for a first service from a base station, transmitting a negative-acknowledgement (NACK) signal for the received DL data by using a pre-allocated resource from the base station, and receiving DL data retransmitted from the base station by using a resource punctured in an UL subframe for a second service, in which the pre-allocated resource includes a resource allocated in the DL subframe for the second service.

In accordance with another aspect of the disclosure, a method of operating a base station in a wireless communication system is provided. The method includes transmitting DL data for a first service to a terminal, receiving a NACK signal for the transmitted DL data from the terminal by using a pre-allocated resource, puncturing a resource for retransmitting the DL data in an UL subframe configured for a second service, and retransmitting the DL data to the terminal by using the punctured resource, in which the pre-allocated resource includes a resource allocated in the DL subframe for the second service.

In accordance with another aspect of the disclosure, a terminal apparatus is provided. The terminal apparatus includes a transceiver configured to transmit and receive a signal, and a control unit configured to be functionally combined with the transceiver, in which the control unit controls the transceiver to receive DL data for a first service from a base station, controls the transceiver to transmit a NACK signal for the received DL data by using a pre-allocated source by the base station, and controls the transceiver to receive DL data retransmitted from the base station by using a resource punctured in an UL subframe for a second service, and the pre-allocated resource includes a resource allocated in the DL subframe for the second service.

In accordance with another aspect of the disclosure, a base station apparatus is provided. The base station apparatus includes a transceiver configured to transmit and receive a signal, and a control unit configured to be functionally combined with the transceiver, in which the control unit controls the transceiver to transmit DL data for a first service to a terminal, controls the transceiver to receive a NACK signal for the transmitted DL data from the terminal by using a pre-allocated source, punctures a resource for retransmitting the DL data in an UL subframe configured for a second service, and controls the transceiver to retransmit the DL data to the terminal by using the punctured resource, and the pre-allocated resource includes a resource allocated in the DL subframe for the second service.

In accordance with another aspect of the disclosure, a method for operating a terminal in a wireless communication system is provided. The method includes transmitting, to a base station through a pre-allocated resource, a signal comprising at least one of a scheduling request (SR) for a first service, or a negative-acknowledgement (NACK) for a received downlink (DL) data associated with the first service; and receiving, from the base station, a response for the signal comprising information indicating a resource. The pre-allocated resource is included in a DL subframe for a second service. The resource comprises at least one of a first resource punctured in a DL subframe for the second service for transmitting uplink (UL) data associated with the first service, or a second resource punctured in a UL subframe for the second service for receiving a retransmission of the DL data. The first service is associated with a transmission time interval (TTI) shorter than a TTI associated with the second service.

In accordance with another aspect of the disclosure, a terminal apparatus is provided. The terminal apparatus includes at least one processor; and a transceiver configured to transmit, to a base station through a pre-allocated resource, a signal comprising at least one of a scheduling request (SR) for a first service, or a negative-acknowledgement (NACK) for a received downlink (DL) data associated with the first service, and receive, from the base station, a response for the signal comprising information indicating a resource. The pre-allocated resource is included in a DL subframe for a second service. The resource comprises at least one of a first resource punctured in a DL subframe for the second service for transmitting uplink (UL) data associated with the first service, or a second resource punctured in a UL subframe for the second service for receiving a retransmission of the DL data. The first service is associated with a transmission time interval (TTI) shorter than a TTI associated with the second service.

In accordance with another aspect of the disclosure, a base station apparatus is provided. The base station apparatus includes at least one processor; and a transceiver configured to receive, from a terminal through a pre-allocated resource, a signal comprising at least one of a scheduling request (SR) for a first service, or a negative-acknowledgement (NACK) for a received downlink (DL) data associated with the first service, and transmit, to the terminal, a response for the signal comprising information indicating a resource. The pre-allocated resource is included in a DL subframe for a second service. The resource comprises at least one of a first resource punctured in a DL subframe for the second service for transmitting uplink (UL) data associated with the first service, or a second resource punctured in a UL subframe for the second service for receiving a retransmission of the DL data. The first service is associated with a transmission time interval (TTI) shorter than a TTI associated with the second service.

The apparatus and a method according to the various embodiments of the disclosure can satisfy low latency by transmitting and receiving data having a short TTI in a subframe configured for a service using a normal TTI.

The apparatus and a method according to the various embodiments of the disclosure can reduce collision and interference between data by using a predetermined resource when providing a service using a short TTI in a subframe configured for a service using a normal TTI.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Hereinafter, various embodiments of the disclosure will be described based on an approach of hardware. However, various embodiments of the disclosure include a technology that uses both hardware and software and thus, the various embodiments of the disclosure may not exclude the perspective of software.

The disclosure describes a technology for effectively multiplexing data having different transmission time intervals (hereafter, referred to as 'TTI') in a wireless communication system. Specifically, the disclosure describes various embodiments for transmitting data having a short TTI in a transmission frame using a normal TTI.

In the following description, terms (for example, a first service and a second service) indicating specific services, terms (for example, a subframe and a symbol) indicating specific resources, terms (for example, a terminal and a base station) indicating specific entities or nodes, and terms indicating the components of an apparatus are exemplified for the convenience of description. Accordingly, the disclosure is not limited to the terms to be described hereafter and other terms having equivalent technical meanings may be used.

Figure 1:
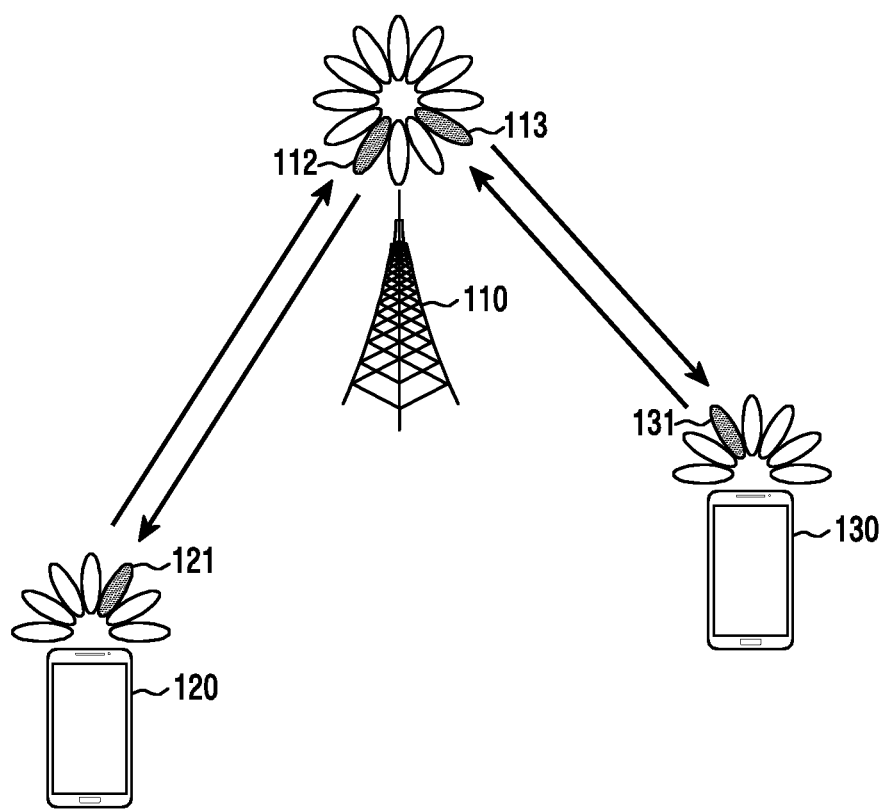
FIG. 1 illustrates a wireless communication system according to various embodiments of the disclosure.

FIG. 1 illustrates a wireless communication system according to various embodiments of the disclosure.

Referring to FIG. 1, a base station (BS) 110, a terminal 120, and a terminal 130, as some of nodes that use wireless channels in a wireless communication system are provided. Although FIG. 1 illustrates only one base station, other base stations that are the same as or similar to the base station 110 may be further included.

The base station 110 is a network infrastructure that provides wireless connection to the terminals 120 and 130. The base station 110 has a coverage that is defined as a predetermined geometric area based on a distance up to which it can transmit a signal. The base station 110 may be referred to, other than the term 'base station', as an access point (AP), an eNodeB (eNB), a 5$^{th}$ generation node (5G node), a wireless point, a transmission/reception point (TRP), a 5$^{th}$ generation NodeB (5GNB), or other terms having equivalent technical meanings as these terms.

The terminal 120 and the terminal 130 are devices that are used by users and perform communication with the base station 110 through a wireless channel. If necessary, at least one of the terminal 120 and the terminal 130 may be operated without participation of a user. For example, at least one of the terminal 120 and the terminal 130 may not be carried by a user, as a device that performs machine type communication (MTC). The terminal 120 and the terminal 130 may be referred to, other than the term 'terminal', as user equipment (UE), a mobile station, a subscriber station, a remote terminal, a wireless terminal, or a user device, or other terms having equivalent technical meanings as these terms.

The base station 110, the terminal 120, and the terminal 130 can transmit and receive wireless signals at millimeter wave (mmWave) bands (for example, 28 GHz, 30 GHz, 38 GHz, and 60 GHz). The base station 110, the terminal 120, and the terminal 130 can perform beamforming to improve channel gains. Beamforming includes transmission beamforming and reception beamforming. The base station 110, the terminal 120, and the terminal 130 can give directivity to transmission signals or reception signals. To this end, the base station 110 and the terminals 120 and 130 can select serving beams 112, 113, 121, and 131 through a beam search procedure.

Figure 2:
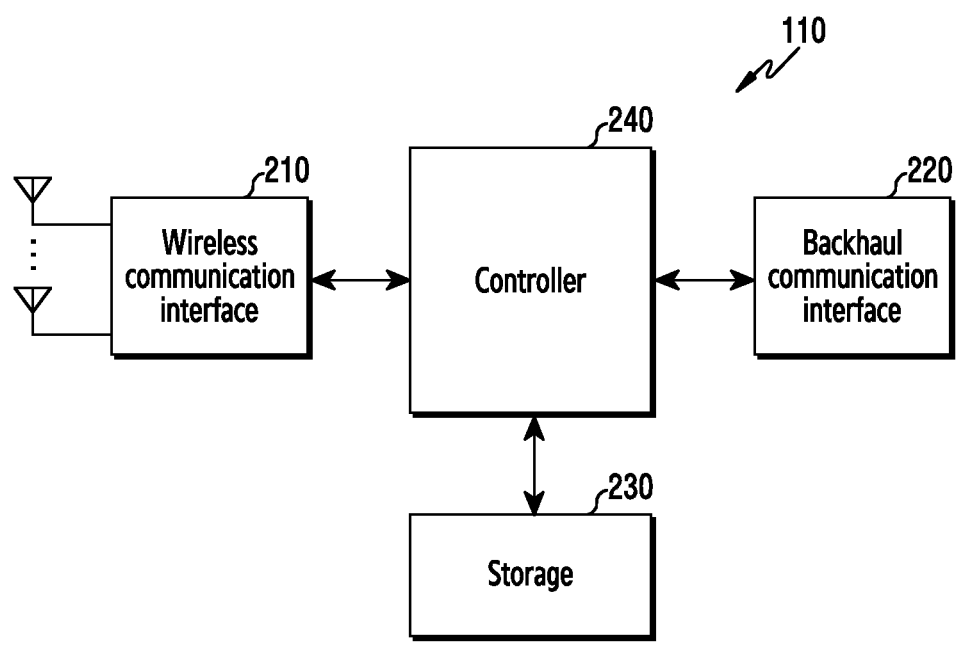
FIG. 2 illustrates a configuration of a base station (BS) in a wireless communication system according to various embodiments of the disclosure.

FIG. 2 illustrates a configuration of a base station in a wireless communication system according to various embodiments of the disclosure. The configuration exemplified in FIG. 2 may be understood as the configuration of the base station 110. Terms '~unit', '~er', etc. used hereafter mean the unit for processing at least one function or operation and may be implemented by hardware, software, or a combination of hardware and software.

Referring to FIG. 2, the base station 110 includes a wireless communication unit 210, a backhaul communication unit 220, a storage unit 230, and control unit 240.

The wireless communication unit 210 performs functions for transmitting/receiving signals through a wireless channel. As an embodiment of the disclosure, the wireless communication unit 210 performs a conversion function among base band signals and bitstreams in accordance with the physical layer specification of the system. For example, the wireless communication unit 210 creates complex symbols by encoding and modulating transmission bitstreams when transmitting data. Further, for example, the wireless communication unit 210 restores received bitstreams by demodulating and decoding base band signals when receiving data. As another embodiment, the wireless communication unit 210 up-converts base band signals into radio frequency (RF) band signals and then transmits the converted signals through an antenna, and down-converts RF band signals received through the antenna into base band signals. In order to perform these functions, the wireless communication unit 210 may include a transmission filter, a reception filter, an amplifier, a mixer, an oscillator, a digital-to-analog converter (DAC), an analog-to-digital converter (ADC), etc.

Further, the wireless communication unit 210 may include a plurality of transmission/reception paths. Further, the wireless communication unit 210 may include at least one antenna array including a plurality of antenna elements. In terms of hardware, the wireless communication unit 210 may be implemented as a digital unit or an analog unit, in which the analog unit may include a plurality of sub-units, depending on the operation power, operation frequency, etc. The wireless communication unit 210 may be referred to as a 'transmitter', a 'receiver', or a 'transceiver'. In the following description, the transmission and reception that are performed by the wireless communication unit 210 are used as meanings that include performing the processing described above.

The backhaul communication unit 220 provides an interface for communication with other nodes in the network. For example, the backhaul communication unit 220 converts bitstreams transmitted from the base station 110 to another node, for example, an another connection node, an another base station, an upper node, and a core network, into physical signals, and converts physical signals received from another node into bitstreams.

The storage unit 230 keeps data, such as fundamental programs, applications, and setting information for operation of the base station 110. The storage unit 230 may be a volatile memory, a nonvolatile memory, or a combination of a volatile memory and a nonvolatile memory. Further, the storage unit 230 provides the kept data in response to a request from the control unit 240.

The storage unit 230 may include at least one processor. The control unit 240 controls the general operations of the base station 110. For example, the control unit 240 transmits and receives signals through the wireless communication unit 210 or the backhaul communication unit 220. Alternatively, the control unit 240 records data on the storage unit 230 or reads the data kept in the storage unit 230. Depending on various embodiments of the disclosure, the control unit 240 can receive uplink control signals (for example, scheduling requests (hereafter, referred to as 'SR') and a connection setting message) from terminals (for example, the terminal 120 and the terminal 130) and perform the operations corresponding to the uplink control signals. Further, the control unit 240 can provide a resource for another service by puncturing a portion of a resource allocated for a service.

Specifically, the control unit 240 controls the wireless communication unit 210 to receive an SR signal by using a pre-allocated resource from the terminal 120, punctures a resource for the terminals 120 to transmit uplink (UL) data for a first service in a downlink (DL) subframe for a second service, allocates a resource for transmitting UL data for the first service, and controls the wireless communication unit 210 to receive the UL data for the first service from the terminal 120 by using the resource punctured in the DL subframe for the second service. The first service corresponds to a service that uses a short TTI (sTTI) and the second service corresponds to a service that uses a normal TTI. Further, the control unit 240 determines whether the magnitude of the received SR signal is a predetermined threshold or more, and when the magnitude of the received SR signal is the predetermined threshold or more, the control unit 240 further punctures the resource for the terminal 120 to transmit the UL data for the first service. The information about the pre-allocated resource is included in a message for setting radio resource control (RRC) connection between the terminal 120 and the base station 110. The pre-allocated resource may be allocated as a cell-specific resource. Further, the control unit 240 controls the wireless communication unit 210 to transmit the information indicating the allocated resource to the terminal 120 and the terminal 130 using the second service in the DL subframe for the second service.

Further, the control unit 240 controls the wireless communication unit 210 to transmit DL data for the first service to the terminal 120, controls the wireless communication unit 210 to receive a negative-acknowledgement (NACK) signal for the transmitted DL data from the terminal 120 by using a pre-allocated resource, punctures a resource for retransmission of the DL data in an UL subframe configured for the second service, and controls the wireless communication unit 210 to retransmit the DL data to the terminal 120 by using the punctured resource. Further, the control unit 240 controls the wireless communication unit 210 to transmit the information about the punctured resource to the terminal 120 or the terminal 130 using the second service.

Figure 3:
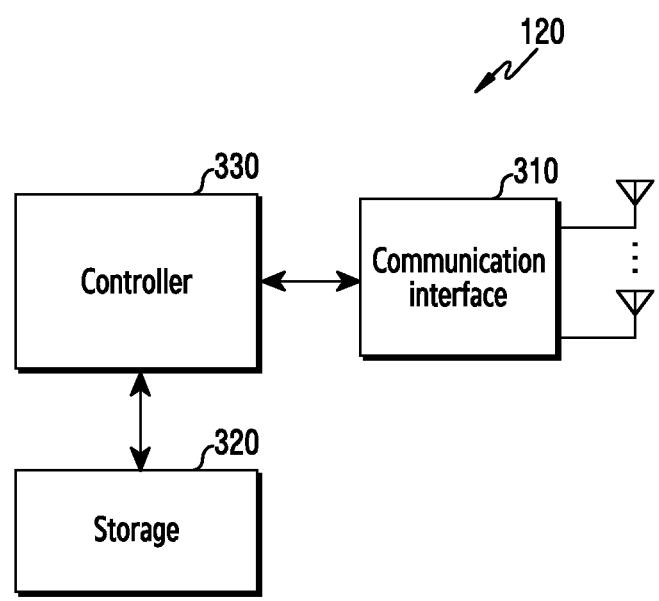
FIG. 3 illustrates a configuration of a terminal in a wireless communication system according to various embodiments of the disclosure.

FIG. 3 illustrates a configuration of a terminal in a wireless communication system according to various embodiments of the disclosure. The configuration exemplified in FIG. 3 may be understood as the configuration of the terminal 120 or the terminal 130. Terms ' . . . unit', ' . . . er' used hereafter mean the unit for processing at least one function or operation and may be implemented by hardware, software, or a combination of hardware and software.

Referring to FIG. 3, the terminal 120 may include a communication unit 310, a storage unit 320, and a controller 330.

The communication unit 310 performs functions for transmitting/receiving signals through a wireless channel. As an embodiment of the disclosure, the communication unit 310 performs a conversion function among base band signals and bitstreams in accordance with the physical layer specification of the system. For example, the communication unit 310 creates complex symbols by encoding and modulating transmission bitstreams when transmitting data. Further, for example, the communication unit 310 restores received bitstreams by demodulating and decoding base band signals when receiving data. As another embodiment of the disclosure, the communication unit 310 up-converts base band signals into RF band signals and then transmits the converted signals through an antenna, and down-converts RF band signals received through the antenna into base band signals. The communication unit 310 may include a transmission filter, a reception filter, an amplifier, a mixer, an oscillator, a DAC, an ADC, etc.

Further, the communication unit 310 may include a plurality of transmission/reception paths. Further, the communication unit 310 may include at least one antenna array including a plurality of antenna elements. In terms of hardware, the communication unit 310 may be implemented as a digital circuit and an analog circuit (for example, a radio frequency integrated circuit (RFIC)). The digital circuit and the analog circuit may be implemented in a package. Further, the communication unit 310 may include a plurality of RF chains. Further, the communication unit 310 can perform beamforming. The communication unit 310 may be referred to as a 'transmitter', a 'receiver', or a 'transceiver'. In the following description, transmitting and receiving that are performed by the communication unit 310 are used as meanings that include performing the processing described above.

The storage unit 320 keeps data, such as fundamental programs, applications, and setting information for operation of the terminal 120. The storage unit 320 may be a volatile memory, a nonvolatile memory, or a combination of a volatile memory and a nonvolatile memory. Further, the storage unit 320 provides the kept data in response to a request from the controller 330.

The controller 330 may include at least one processor or microprocessor, or may be a part of a processor. Further, a portion of the communication unit 310 and the controller 330 may be referred to as a communication processor (CP). The controller 330 controls the general operations of the terminal 120. For example, the controller 330 transmits and receives signals through the communication unit 310. Alternatively, the controller 330 records data on the storage unit 320 or reads the data kept in the storage unit 320. Depending on various embodiments of the disclosure, the controller 330 can control the communication unit 310 to transmit uplink control signals (for example, an SR, a connection setting message, and an acknowledgement (ACK)/NACK) to a base station (for example, the base station 110). Further, the control unit 240 can recognize a resource for another service that is provided by puncturing a portion of a resource allocated for a service, and can perform communication by using the recognized resource. Further, the control unit 240 can control the communication unit 310 to broadcast control information to another surrounding terminal (for example, the terminal 130).

Specifically, the controller 330 controls the communication unit 310 to transmit an SR signal by using a pre-allocated resource from the base station 110, and controls the communication unit 310 to transmit UL data for the first service by using a resource punctured in the DL subframe for the second service. Further, the controller 330 detects whether DL data is transmitted in the DL subframe for the second service after transmitting the SR signal, and when transmission of the DL data in the DL subframe for the second service is not detected, the controller 330 controls the communication unit 310 to transmit UL data for the first service.

Further, the controller 330 controls the communication unit 310 to receive DL data for the first service from the base station 110, controls the communication unit 310 to transmit a NACK signal for the received DL data by using a pre-allocated resource from the base station 110, and controls the communication unit 310 to receive DL data retransmitted from the base station 110 by using a resource punctured in the UL subframe for the second service. Further, the controller 330 controls the communication unit 310 to broadcast information indicating that the terminal 120 uses the first service. The broadcasted information includes information indicating the size of the DL data for the first service.

Figure 4:
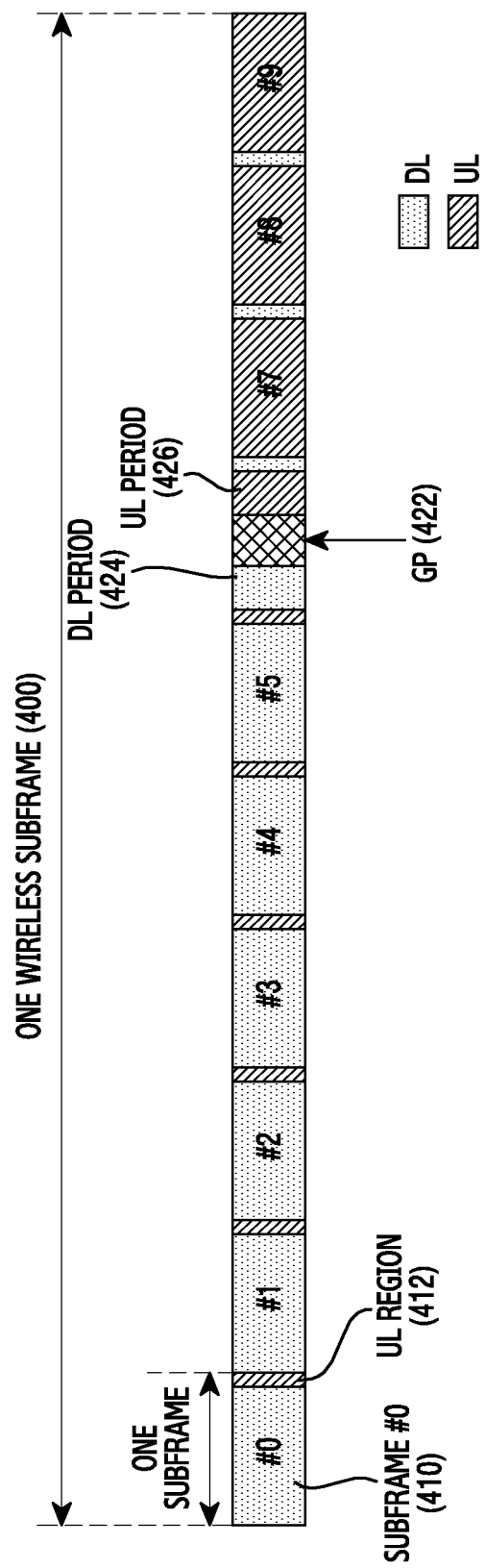
FIG. 4 illustrates a structure of a radio frame of a wireless communication system according to various embodiments of the disclosure.

In the wireless communication system, UL/DL data packet transmission between a base station and a terminal is performed in the unit of subframe (SF) and the subframe is set in the unit of predetermined time (for example, 1 ms and 0.2 ms). A radio frame includes a plurality of subframes. For example, a radio frame may include ten subframes. The radio frame can support different structures, depending on whether resources to which UP/DL data packet is transmitted are allocated to different frequencies (for example, frequency division duplex (FDD)) or allocated to the same frequency (for example, time division duplex (TDD)). FIG. 4 to be described hereafter illustrates the structure of a radio frame in TDD, in which a radio frame includes a plurality of DL subframes (for example, subframe #0 to subframe #5) and a plurality of UL subframes (for example subframe #7 to subframe #9).

FIG. 4 illustrates a structure of a radio frame of a wireless communication system according to various embodiments of the disclosure. The structure of a radio subframe shown in FIG. 4 and the description of the structure are only examples and the disclosure is not limited to specific embodiments.

Referring to FIG. 4, a radio frame 400 includes at least one DL/UL switching period. The switching period means a period where a DL subframe is changed to an UL subframe or an UL subframe is changed to a DL subframe. For example, as shown in FIG. 4, a switching period may exist between the subframe #5 and the subframe #7. The switching period includes a guard period (GP) 422, a DL period 424, and an UL period 426. In the DL period 424, a terminal can perform initial cell search, synchronization, or channel estimation. In the UL period 426, a base station can perform channel estimation and UL transmission synchronization of a terminal. The GP 422, which is a period for removing interference between UL transmission and DL transmission, may not be allocated to any signal.

At least one of the subframes included in the radio frame 400 may be a self-contained subframe. The self-contained subframe means a subframe having a structure that includes a region in which a DL signal (or an UL signal) can be transmitted in an UL subframe period or (a DL subframe period). For example, referring to FIG. 4, a DL subframe 410 corresponds to a self-contained subframe including an UL region 412 in which an UL signal can be transmitted. A terminal can transmit UL control information to a base station by using the UL region 412. For example, a terminal can transmit an SR signal to a base station by using the UL region 412.

Figure 5:
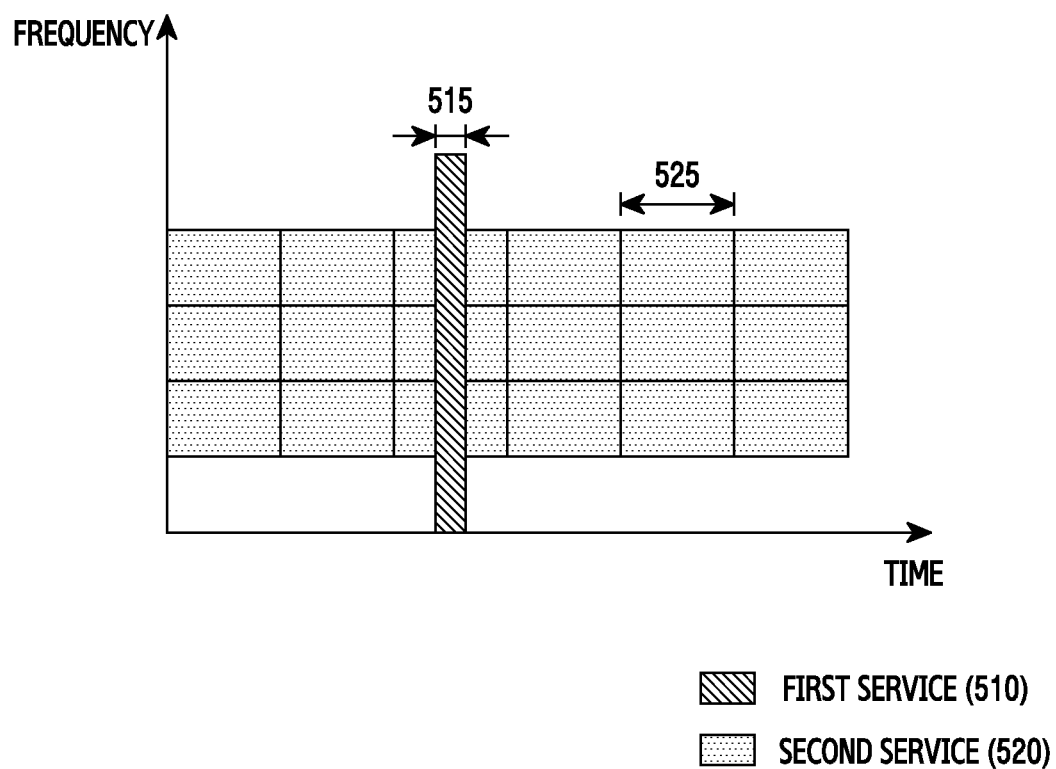
FIG. 5 illustrates allocating resources for services in a wireless communication system according to various embodiments of the disclosure.

FIG. 5 illustrates allocating resources for services in a wireless communication system according to various embodiments of the disclosure.

Referring to FIG. 5, a first service 510 and a second service 520 may be provided. Depending on embodiments of the disclosure, the base station 110 may provide the first service 510 to the terminal 120 and the second service 520 to the terminal 130, or may provide both of the first service 510 and the second service 520 to the terminal 120.

The first service 510 means a service that requires high reliability and low delay. The first service 510 may be referred to as an ultra-reliable low-latency communication (URLLC) service. The first service 510 may be used for a technology having relatively high requirements in reliability, delay time, and throughput. For example, the first service 510 may be used to control communication processes required for an emergency network, a remote operation, an autonomous vehicle, etc.

The second service 520 means a service that requires a high data transmission speed. The second service 520 may be referred to as an enhanced mobile broadband (eMBB) service. The second service 520 may be used for a technology that requires high average spectrum efficiency. For example, the second service 520 may be used for common communication and virtual reality technologies.

A TTI 515 for the first service 510 may be set to be shorter than a TTI 525 for the second service 520 in order to secure low delay. The TTI means a time interval required for transmitting a data packet. In an embodiment of the disclosure, a TTI for a specific service may be set as a single subframe. In another embodiment of the disclosure, a TTI for a specific service may be set as a plurality of subframes. In another embodiment of the disclosure, a plurality of TTIs for a specific service may constitute a single subframe. For example, referring to FIG. 5, the TTI 515 for the first service 510 may be 0.25 ms and the TTI 525 for the second service 520 may be 1 ms.

Allocation of a resource for the first service 510 may be performed independently from allocation of a resource for the second service 520. Accordingly, the TTI 515 for the first service 510 may overlap the TTI 525 for the second service 520. This may be for allowing the first service 510 to be provided while the second service 520 is provided, when the first service 510 is urgently generated. In other words, due to urgency of the first service 510, a resource for the first service 510 may be allocated with a resource for the second service 520 allocated. Accordingly, the resource for the first service 510 may overlap the resource for the second service 520, even though a resource is allocated by an entity.

As described above, the first service uses a short TTI system, which uses a short TTI, to reduce delay time between data transmission. Further, since the first service is generated in an urgent situation, a puncturing concept for transmitting/receiving data for the first service is proposed in the resource of a service using a normal TTI (for example, the second service). The following two scenarios are described in the following description. First, referring to FIGS. 6A and 6B, 7, 8, 9A to 9F, 10A and 10B, 11, 12, 13A to 13C, and 14A and 14B, a scenario in which UL data for the first service is multiplexed in a DL subframe configured for the second service is described. Second, referring to FIGS. 15 to 19, a scenario in which DL data for the first service is multiplexed in an UL subframe configured for the second service is described.

Scenario 1: When UL Data for First Service is Multiplexed in DL Subframe Configured for Second Service FIG. 6A illustrates data collision when UL data for a first service is transmitted in a DL subframe configured for a second service in a wireless communication system according to various embodiments of the disclosure.

Figure 6A:
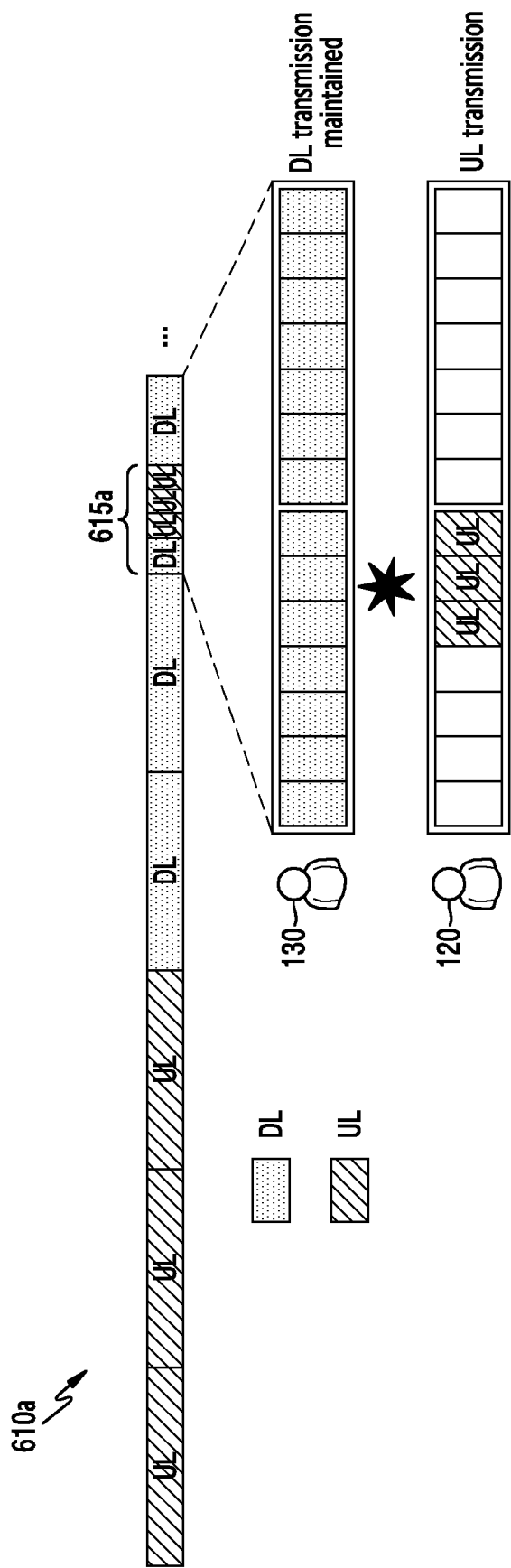
FIG. 6A illustrates data collision when uplink (UL) data for a first service is transmitted in a downlink (DL) subframe configured for a second service in a wireless communication system according to various embodiments of the disclosure.

Referring to FIG. 6A, a frame 610a is configured for a second service between the base station 110 and the terminal 130. The frame 610a includes a plurality of UL subframes for UL data and a plurality of DL subframes for DL data. While the second service between the base station 110 and the terminal 130 is provided, a situation in which the terminal 120 transmits UL data for the first service may be urgently generated. In this case, the terminal 120 can transmit UL data to the base station 110 by using a DL subframe 615a. As described above, the operation of transmitting data for another service in the region overlapping a preconfigured resource or the operation of allocating a resource for transmitting another service data may be referred to as puncturing. According to this puncturing, the terminal 120 can quickly transmit UL data for the first service to the base station 110. However, when DL transmission between the base station 110 and the terminal 130 is maintained in the DL subframe 615a, collision or interference may be generated between the UL data transmitted by the terminal 120 and the DL data transmitted by the base station 110. Further, according to half-duplex, the base station 110 selectively transmit/receive UL data for the first service and DL data for the second service, so the base station 110 may drop specific data.

Figure 6B:
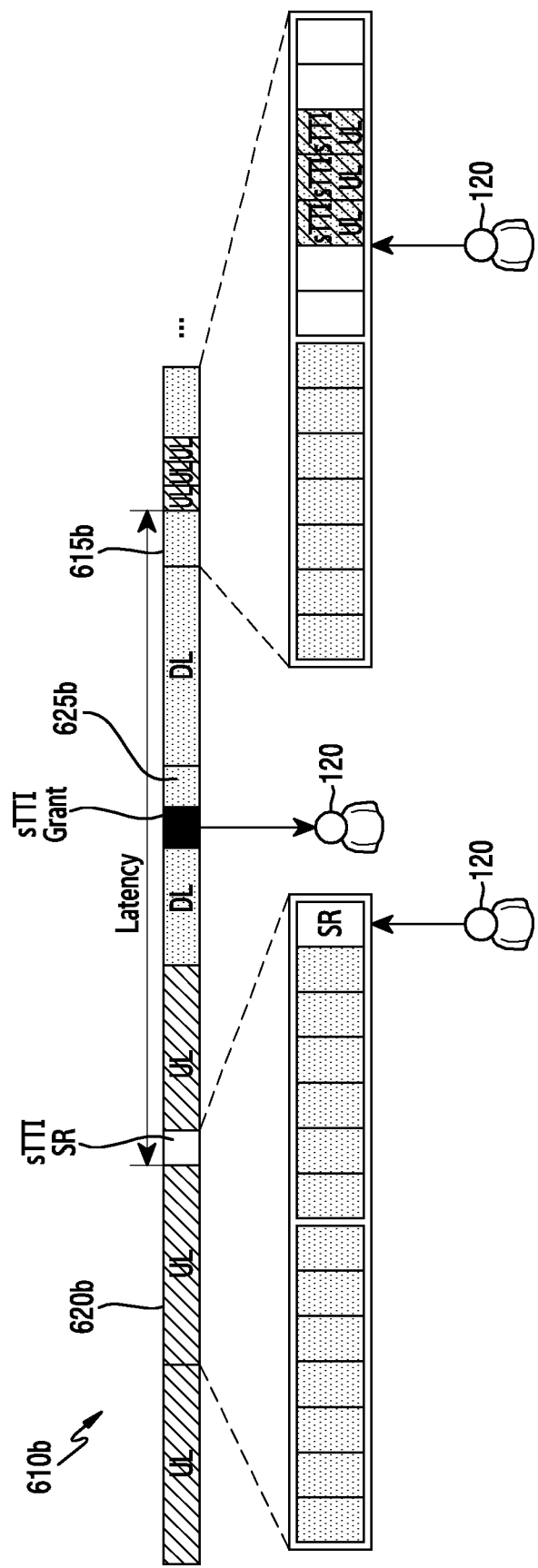
FIG. 6B illustrates transmission delay when UL data for a first service is transmitted in a DL subframe configured for a second service in a wireless communication system according to various embodiments of the disclosure.

FIG. 6B illustrates transmission delay when UL data for a first service is transmitted in a DL subframe configured for a second service in a wireless communication system according to various embodiments of the disclosure.

Referring to FIG. 6B, a frame 610b is configured for a second service between the base station 110 and the terminal 130. The frame 610b includes a plurality of UL subframes and a plurality of DL subframes. When a situation in which the terminal 120 transmits UL data for the first service is urgently generated while the second service is provided between the base station 110 and the terminal 130, the terminal 120 can transmit an SR signal that requests resource allocation for transmitting UL data in an UL subframe 620b to the base station 110. The base station 110 allocates a resource enabling the terminal 120 to transmit UL data for the first service based on the received SR signal. The base station 110 can transmit a grant signal indicating the allocated resource to the terminal 120 by using a DL subframe 625b. The terminal 120 can transmit UL data for the first service to the base station 110 by using an UL subframe 615b based on allocated resource information included in the grant signal. According to this procedure, since the terminal 120 uses a pre-allocated resource, collision between the UL data for the first service and the UL data for the second service may not be generated. However, since the terminal 120 has to wait for the grant signal that is received from the base station 110, transmission latency may be generated.

Hereafter, the disclosure proposes embodiments that can reduce transmission latency in the scenario 1 and can reduce interference between the UL data for the first service and the DL data for the second service, with reference to FIGS. 7, 8, 9A to 9F, 10A and 10B, 11, 12, 13A to 13C, and 14A and 14B. The base station 110 and the terminal 120 can perform operations according to two situations. First, it can be assumed that the base station 110 can inform the terminal 120 and the terminal 130 of allocated resource information (hereafter, first embodiment). Second, it can be assumed that the base station 110 cannot inform the terminal 120 and the terminal 130 of allocated resource information (hereafter, second embodiment).

Figure 7:
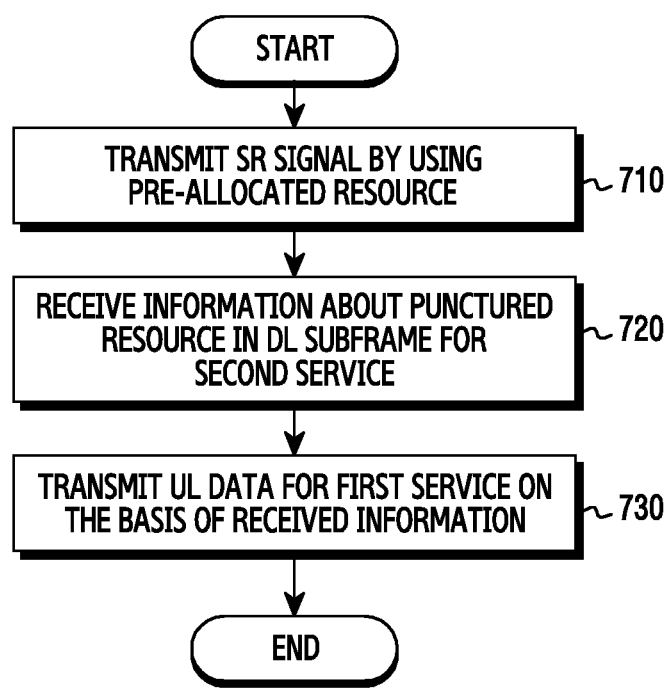
FIG. 7 illustrates operation flow of a terminal for transmitting UL data for a first service in a DL subframe configured for a second service according to a first embodiment of the disclosure.

First Embodiment: When Base Station Can Give Notice of Allocated Resource Information FIG. 7 illustrates operation flow of a terminal for transmitting UL data for a first service in a DL subframe configured for a second service according to the first embodiment of the disclosure. FIG. 7 illustrates operation flow of a terminal 120 using the first service.

Referring to FIG. 7, in operation 710, the terminal 120 transmits an SR signal to a base station 110 by using a pre-allocated resource from the base station 110. The term 'pre-allocated' means exclusive allocation for transmission of an SR signal without a request from a terminal. The terminal 120 can know the location of a pre-allocated resource from system information transmitted from the base station 110 or definition (for example, standardization) made in advance. For example, the pre-allocated resource may include a resource allocated in a self-contained subframe. Further, the pre-allocated resource may include a resource allocated in a DL subframe for the second service.

In operation 720, the terminal 120 receives information about a punctured resource from the base station 110 in the DL subframe for the second service. The punctured resource includes a resource allocated to be able to transmit UL data for the first service in the DL subframe for the second service. The information about the punctured resource may not include information that specifies the terminal 120 transmitting the SR.

In operation 730, the terminal 120 receives the UL data for the first service based on the received information. In other words, the terminal 120 can transmit the UL data to the base station 110 by using the punctured resource. When the information about the punctured resource does not include information that specifies the terminal 120 transmitting the SR, the terminal 120 can recognize a resource to be used to transmit UL data based on the corresponding relationship between the punctured resource and the resource used for transmitting the SR.

Figure 8:
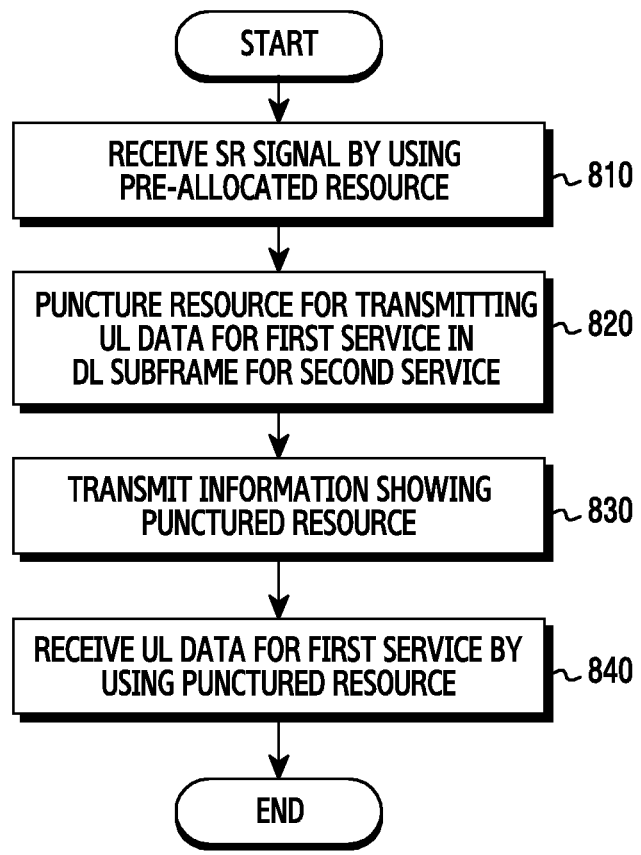
FIG. 8 illustrates operation flow of a base station for transmitting UL data for a first service in a DL subframe configured for a second service according to the first embodiment of the disclosure.

FIG. 8 illustrates operation flow of a base station for transmitting UL data for a first service in a DL subframe configured for a second service according to the first embodiment of the disclosure. FIG. 8 illustrates operation flow of the base station 110.

Referring to FIG. 8, in operation 810, the base station 110 receives an SR signal from the terminal 120 by using a pre-allocated resource. The pre-allocated resource includes a resource allocated in a self-contained subframe. The pre-allocated resource may be determined in the procedure of setting RRC connection between the terminal 120 and the base station 110.

In operation 820, the base station 110 punctures a resource for transmitting UL data for the first service in the DL subframe for the second service. The puncturing is determined based on a TTI required for the first service and the size of the UL data.

In operation 830, the base station 110 transmits information indicating the punctured resource to the terminal 120. The information indicating the punctured resource can be transmitted through a physical downlink control channel (PDCCH). In addition, the base station 110 can transmit the information indicating the punctured resource to the terminal 130 using the second service. The terminal 130 can recognize that the first service is provided between the base station 110 and the terminal 120 based on the information indicating the punctured resource. The information about the punctured resource may not include information that specifies the terminal 120 transmitting the SR.

In operation 840, the base station 110 receives UL data for the first service from the terminal 120 by using the punctured resource. In this case, the base station 110 does not transmit DL data supposed to be provided to the terminal 130, but receives UL data from the terminal 120.

FIGS. 9A, 9B, 9C, 9D, 9E and 9F illustrate a signal flow and resource allocation for transmitting UL data for a first service in a DL subframe configured for a second service according to the first embodiment of the disclosure. In the following description, it is assumed that a terminal 120a is a terminal that uses the first service (that is, a service using a short TTI) and a terminal 130a is a terminal that uses the second service (that is, a service using a normal TTI).

Figure 9A:
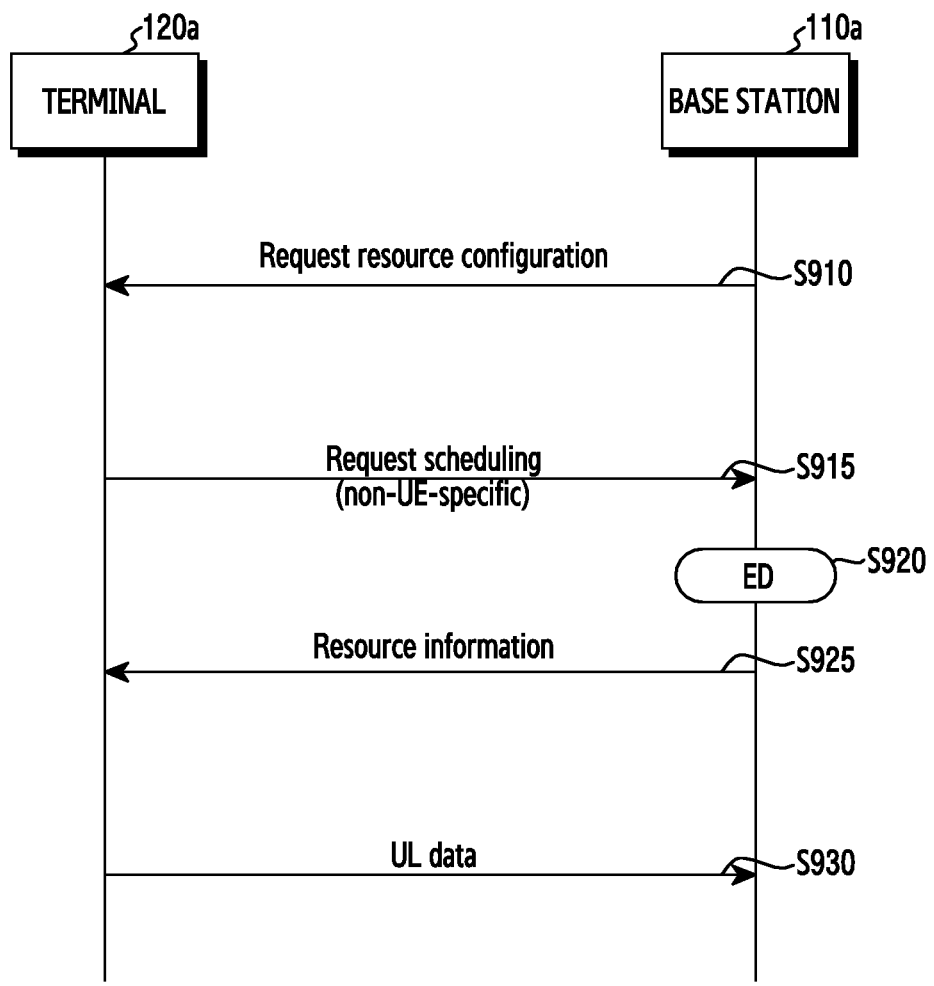
FIGS. 9A, 9B, 9C, 9D, 9E, and 9F illustrate a signal flow and resource allocation for transmitting UL data for a first service in a DL subframe configured for a second service according to the first embodiment of the disclosure.

Referring to FIG. 9A, in operation S910, a base station 110a transmits request resource configuration information to the terminal 120a. The request resource configuration information means pre-allocated resource information for the terminal 120a to transmit an SR signal to the base station 110a. The request resource configuration is not limited to the terminal 120a (non-UE-specific). For example, the request resource configuration can provide information about a cell-specific resource. The request resource configuration information is determined in the procedure of setting RRC between the base station 110a and the terminal 120a. For example, the request resource configuration information may be included in an RRC message that is transmitted from the base station 110a.

Figure 9B:
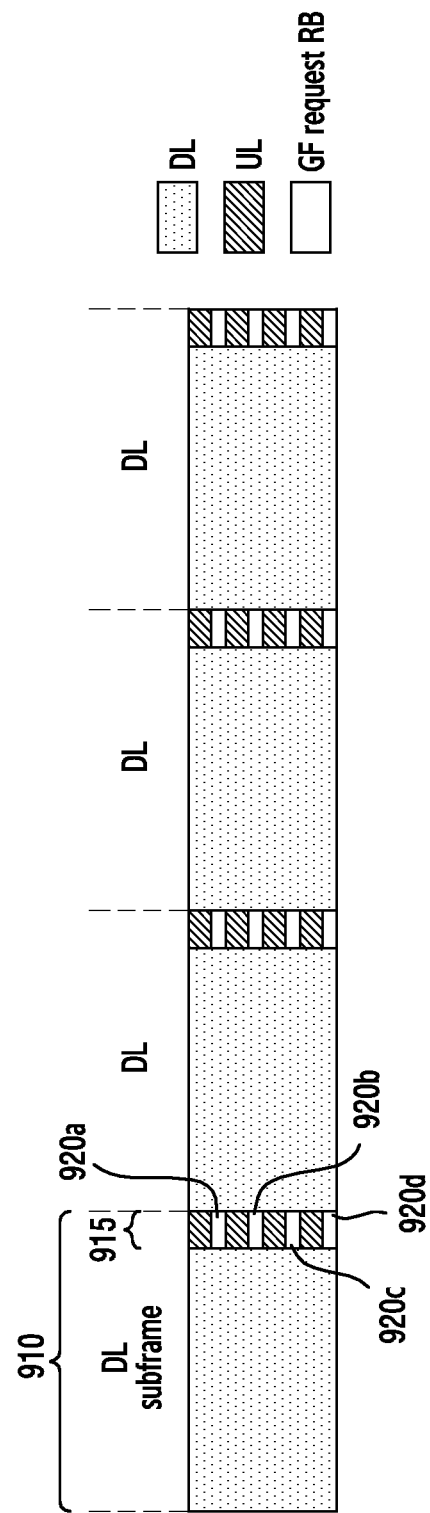

For example, a resource block (RB) shown by the request resource configuration information is as in FIG. 9B.

Referring to FIG. 9B, a DL subframe 910 corresponds to a self-contained subframe. In other words, the DL subframe 910 includes both of a DL transmission region and an UL transmission region 915. The base station 110a can allocate a plurality of RBs in the UL transmission region 915. For example, the base station 110a can determine RBs 920a, 920b, 920c, and 920d for terminals using the first service to transmit an SR signal. The RBs can be determined in accordance with various patterns. For example, as shown in FIG. 9B, the RBs 920a, 920b, 920c, and 920d for transmitting an SR signal can be alternately allocated together with RBs for transmitting other UL control information. The request resource configuration information can indicate the RBs in various ways. For example, the request resource configuration information may include an index for each of the RBs 920a, 920b, 920c, and 920d.

When UL data for the first service is generated, the terminal 120a transmits an SR signal to the base station 110a in operation S915. The SR signal is a signal through which the terminal 120a requests the base station 110a to allocate a resource for transmitting UL data for the first service (that is, to perform puncturing) in the DL subframe configured for the second service. For example, the SR signal may include a licensed-assisted access (LAA) reservation signal or a sounding reference signal (SRS).

The SR signal is transmitted using an RB indicated by the request resource configuration. For example, the terminal 120a can select a RB from the RBs 920a, 920b, 920c, and 920d allocated to transmit the SR signal.

Figure 9C:
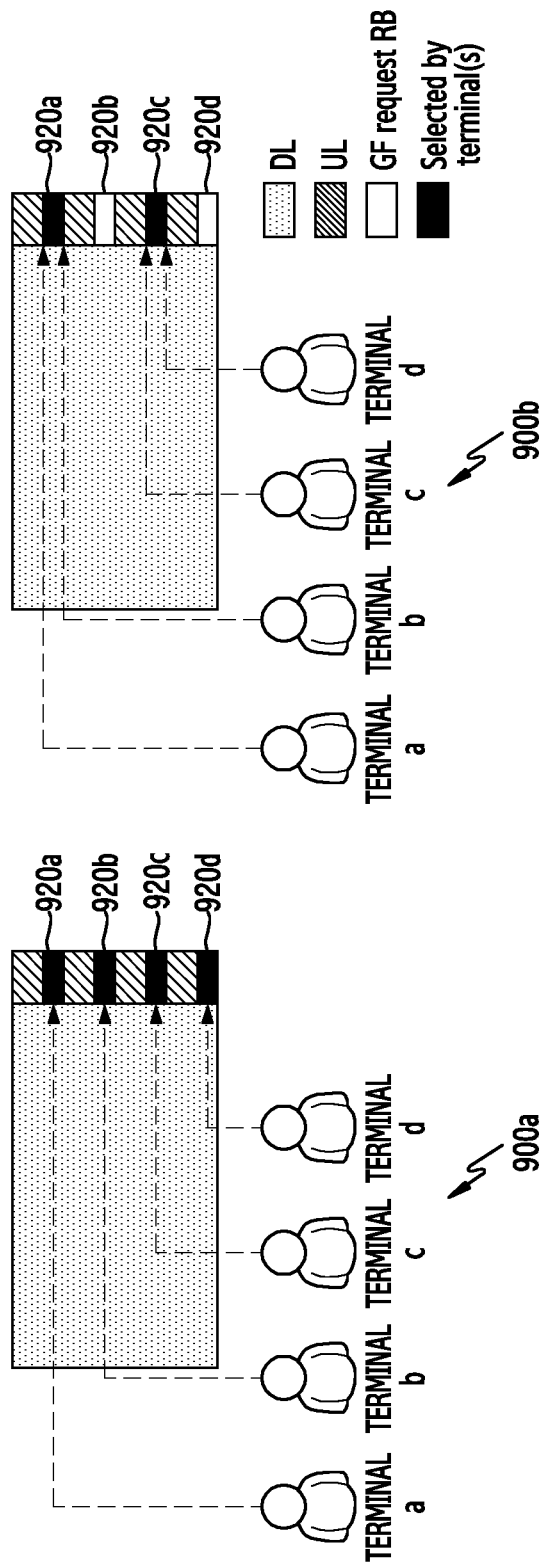

Referring to FIG. 9C, reference numeral '900a' indicates that a terminal 'a' can transmit an SR signal by using the RB 920a, a terminal 'b' can transmit an SR signal by using the RB 920b, a terminal 'c' can transmit an SR signal by using the RB 920c, and a terminal 'd' can transmit an SR signal by using the RB 920d. As another example, as indicated by reference numeral '900b' in FIG. 9C, the terminal 'a' and the terminal 'b' can transmit SR signals by using the RB 920a and the terminal 'c' and the terminal 'd' can transmit SR signals by using the RB 920c.

In operation S920, the base station 110a performs energy detection (ED) on pre-allocated resources for SR signals. In other words, the base station 110a determines whether energy is sensed in order to determine whether signals have been transmitted from resources indicated by the request resource configuration. When the intensities of power measured at the resources are a predetermined threshold or more, the base station 110a determines that SR signals have been transmitted through the corresponding resources and allocates a resource for UL data transmission.

The base station 110a allocates an UL data transmission resource for the first service based on the energy detection result. The UL data transmission resource may be allocated in any of units of subframe, slot, mini-slot, and symbol, depending on the implementation method. The base station 110a can determine the location or the size of the UL data transmission resource based on at least one of the number of RBs used for transmitting the SR signals and the TTI required for UL data transmission for the first service other than the measured intensities of power. Further, since the SR signal does not include information that specifies a terminal, it is possible to determine the location or the size of the UL data transmission resource by using the index of the RB used for transmitting the SR signal.

Figure 9D:
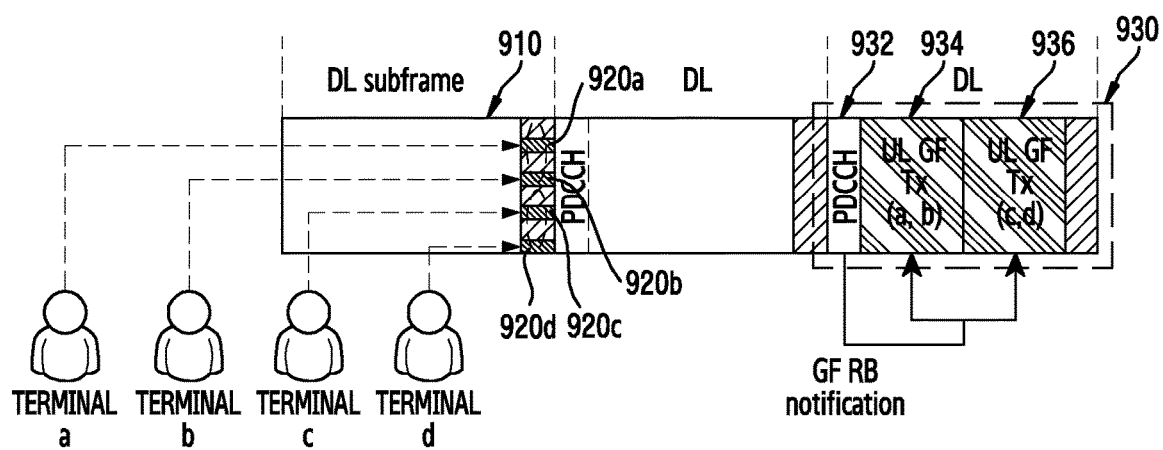

Referring to FIG. 9D, the terminal 'a' to the terminal 'd' can transmit an SR signal, respectively using the RBs 920a to 920d included in the DL subframe 910. The base station 110a receiving a plurality of SR signals in the DL subframe 910 can perform puncturing on a DL subframe 930 based on the TTI of the UL data for the first service and process times for processing signals in the base station 110a and the terminals 'a' to 'd'. The base station 110a can determine UL transmission resources 934 and 936 as UL data transmission resources for the first service in the DL subframe 930. The locations and sizes of the UL transmission resources 934 and 936 can be freely determined by the base station 110a. Further, locations and sizes of the UL transmission resources 934 and 936 can be determined based on the number of RBs used for transmitting the SR signals and the indexes of the RBs. For example, as shown in FIG. 9D, the base station 110a can allocate the UL transmission resource 934 to the terminals corresponding to the RB 920a and the RB 920b (that is, the terminal 'a' and the terminal 'b') and the UL transmission resource 936 to the terminals corresponding to the RB 920c and the RB 920d (that is, the terminal 'c' and the terminal 'd'). In this case, the numbers of the RB corresponding to the UL transmission resources 934 and 936, respectively, are the same (two), so the base station 110a can allocate the UL transmission resources 934 and 936 such that the sizes of the resources are the same.

Figure 9E:
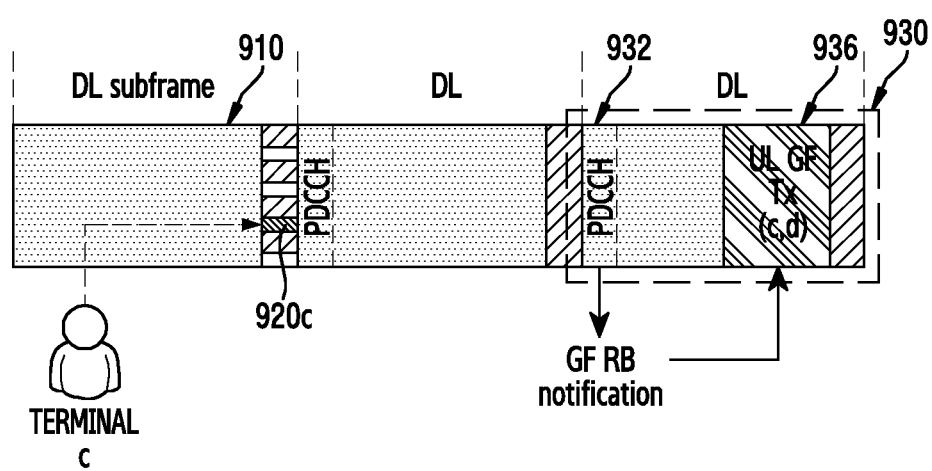

Referring to FIG. 9E, the terminal 'c' can transmit an SR signal by using the RB 920c included in the DL subframe 910. When power that is the threshold or more is detected in a pre-allocated resource, the base station 110a can perform puncturing on the DL subframe 930 based on the TTI of UL data for the first service and process times for processing signals in the base station 110a and the terminal 'c'. The base station 110a can determine the UL transmission resource 936 as an UL data transmission resource for the first service in the DL subframe 930. The base station 110a can allocate the UL transmission resource 936 to the terminal corresponding to the RB 920c (that is, the terminal 'c').

Figure 9F:
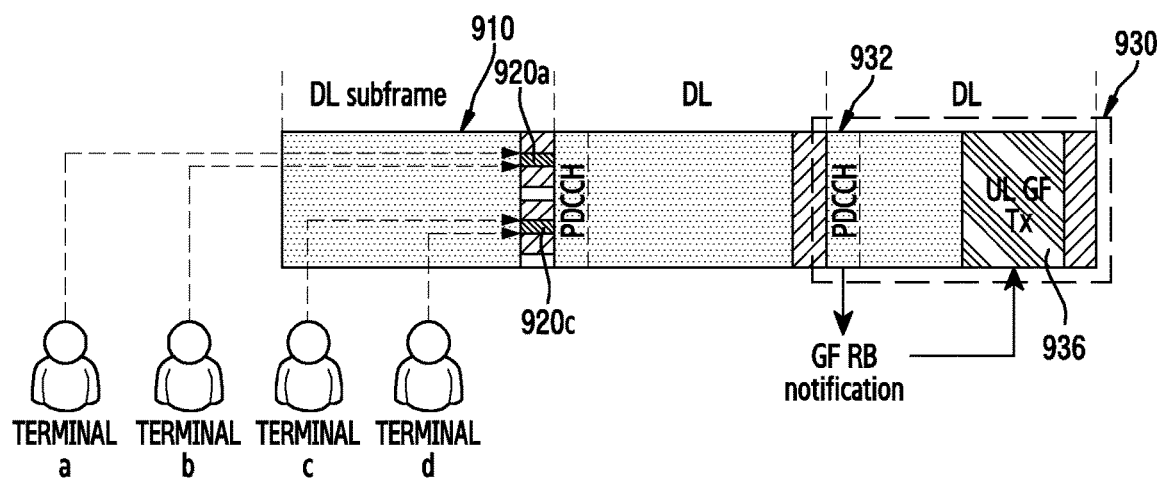

Referring to FIG. 9F, the terminal 'a' and the terminal 'b' can transmit SR signals by using the RB 920a and the terminal 'c' and the terminal 'd' can transmit SR signals by using the RB 920c. When a resource having a power intensity that is the threshold or more is detected, a UL transmission resource 936 is allocated.

In operation S925, the base station 110a transmits information about the punctured resource to the terminal 120a. The information about the punctured resource can be transmitted in various ways. For example, as shown in FIGS. 9D to 9F, the information about the punctured resource can be transmitted through a PDCCH 932. Further, the information about the punctured resource may not include information that specifies a terminal and may be displayed using the indexes of RBs. Accordingly, the terminal 120a can recognize the punctured resource. However, since the punctured information does not include information that specifies a terminal, it cannot be considered as a resource clearly granted to the terminal 120a, so the method described above can be called 'Grant Free (GF)' method.

In operation S930, the terminal 120a transmits UL data for the first service based on the information about the punctured resource. For example, referring to FIG. 9D, the terminal 'a' and the terminal 'b' can transmit UL data by using the UL transmission resource 934, and the terminal 'c' and the terminal 'd' can transmit UL data by using the UL transmission resource 936. Alternatively, referring to FIG. 9E, the terminal 'c' can transmit UL data by using the UL transmission resource 936.

According to the embodiments described above, the terminal 120a can request a resource for the first service to the base station 110a and transmit UL data for the first service through the punctured resource. When another terminal (for example, the terminal 130) provided with the second service attempts to receive data through the punctured resource, a reception error is determined and a NACK is transmitted. Accordingly, an embodiment that provides information about a resource punctured for the first service to another terminal (for example, the terminal 130) provided with the second service in order to prevent unnecessary determination of an error and NACK feedback is described hereafter.

Figure 10A:
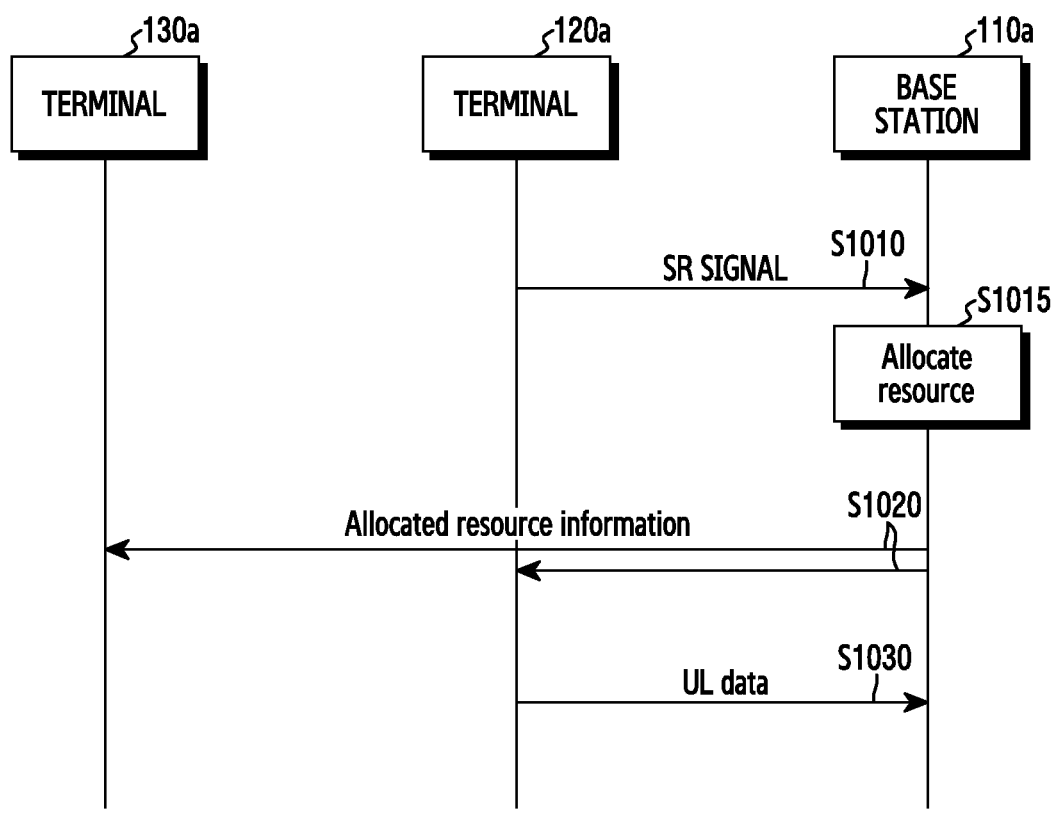
FIGS. 10A and 10B illustrate an operation of transmitting resource information punctured according to the first embodiment of the disclosure.
Figure 10B:
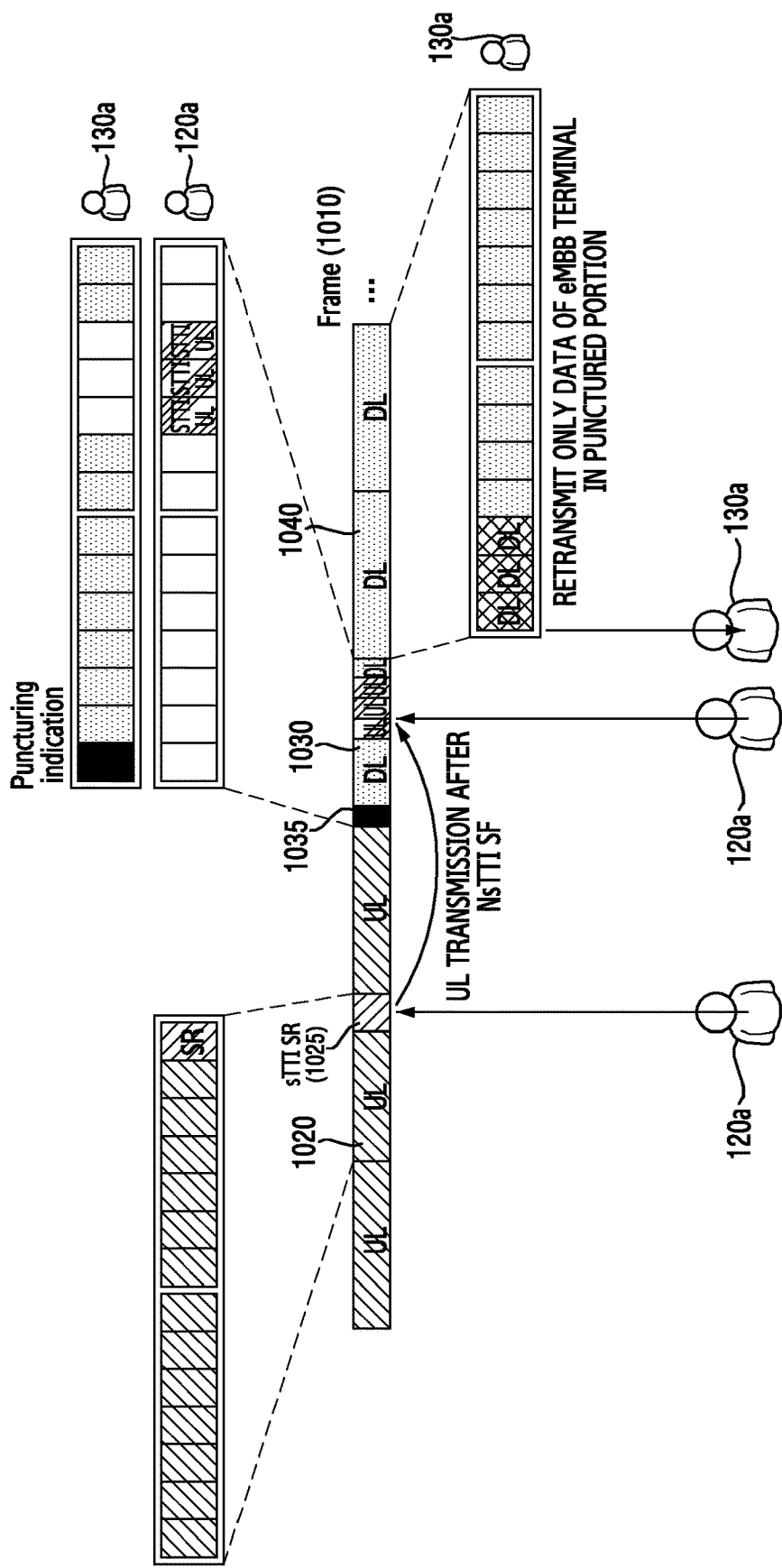

FIGS. 10A and 10B illustrate an operation of transmitting resource information punctured according to the first embodiment of the disclosure.

Referring to FIG. 10A, when UL data for the first service is generated, the terminal 120a transmits an SR signal to the base station 110a in operation S1010. The SR signal may be transmitted using symbols included in a subframe. For example, referring to FIG. 10B, a frame 1010 for the second service between the base station 110a and the terminal 130a is configured in advance. The frame 1010 includes a plurality of UL subframes and a plurality of DL subframes. The subframes each include a plurality of symbols. One subframe may include fourteen symbols. The terminal 120a can transmit an SR signal to the base station 110a by using symbols 1025 included in an UL subframe 1020.

Referring to FIG. 10B, the terminal 120a transmits an SR signal by using symbols included in an UL subframe, but as shown in FIG. 9A, the terminal 120a may transmit the SR signal by using a self-contained subframe included in a DL subframe.

In operation S1015, the base station 110a determines a resource for UL data transmission based on the received SR signal. The UL data transmission resource can be determined based on the TTI applied to the first service. The TTI can be determined in the initial setting procedure between the base station 110a and the terminal 120a. For example, when the TTI of UL data using the first service is N (N is a natural number) subframes, as shown in FIG. 10B, the base station 110a can allocate a resource such that the terminal 120a can transmit UL data after the N subframes from a subframe receiving the SR signal (or the subframe in which the terminal 120a transmitted the SR signal). The base station 110a can determine three symbols of the symbols included in a DL subframe 1030 as UL data transmission resources based on the size of the UL data.

In operation S1020, the base station 110a transmits the determined resource information to the terminal 120a and the terminal 130a by using a PDCCH 1035 of the DL subframe 1030. In operation S1030, the terminal 120a can transmit UL data through the punctured resource. The terminal 130a may not receive DL data from the base station 110a in the DL subframe 1030 based on the received information. In this case, the terminal 130a does not transmit a specific NACK signal. Further, the terminal 130a can receive data corresponding to the punctured resource in a DL subframe 1040 after the DL subframe 1030.

Figure 11:
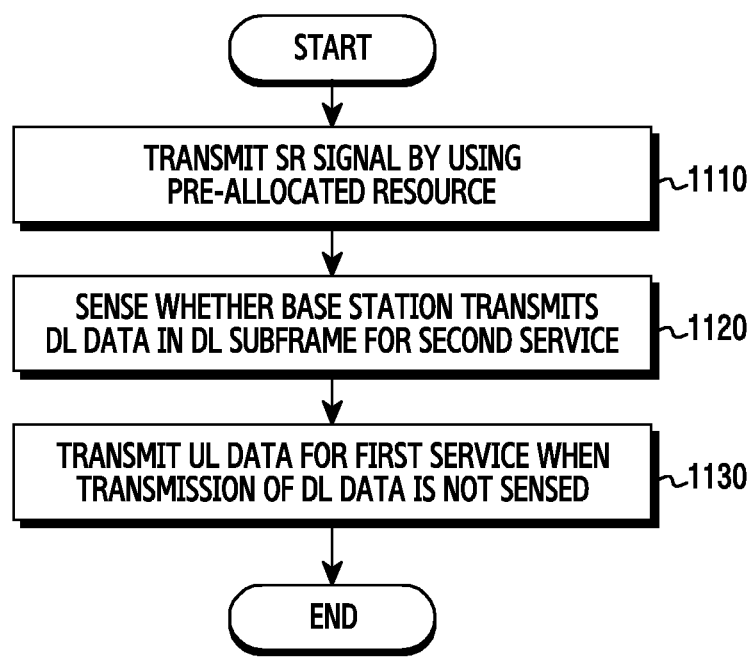
FIG. 11 illustrates operation flow of a terminal for transmitting UL data for a first service in a DL subframe configured for a second service according to a second embodiment of the disclosure.

Second Embodiment: When Base Station Cannot Give Notice of Allocated Resource Information FIG. 11 illustrates operation flow of a terminal for transmitting UL data for a first service in a DL subframe configured for a second service according to a second embodiment of the disclosure. FIG. 11 illustrates operation flow of a terminal 120 using the first service.

Referring to FIG. 11, in operation 1110, the terminal 120 transmits an SR signal to a base station 110 by using a pre-allocated resource from the base station 110. The pre-allocated resource corresponds to a resource allocated in a self-contained subframe. In other words, the pre-allocated resource corresponds to a resource allocated in a DL subframe for the second service.

In operation 1120, the terminal 120 senses whether the base station 110 transmits DL data in the DL subframe for the second service. In other words, the terminal 120 performs listen before talk (LBT). When the base station 110 transmits the DL data, UL data that is transmitted from the terminal 120 may collide with the DL data transmitted from the base station 110, so the terminal 120 does not transmit the UL data.

In operation 1130, when transmission of the DL data is not sensed, the terminal 120 transmits UL data for the first service to the base station 110. The base station 110 has already performed puncturing for UL data transmission based on an SR signal received from the terminal 120, so the UL data transmitted from the terminal 120 does not collide with other data using the second service.

Figure 12:
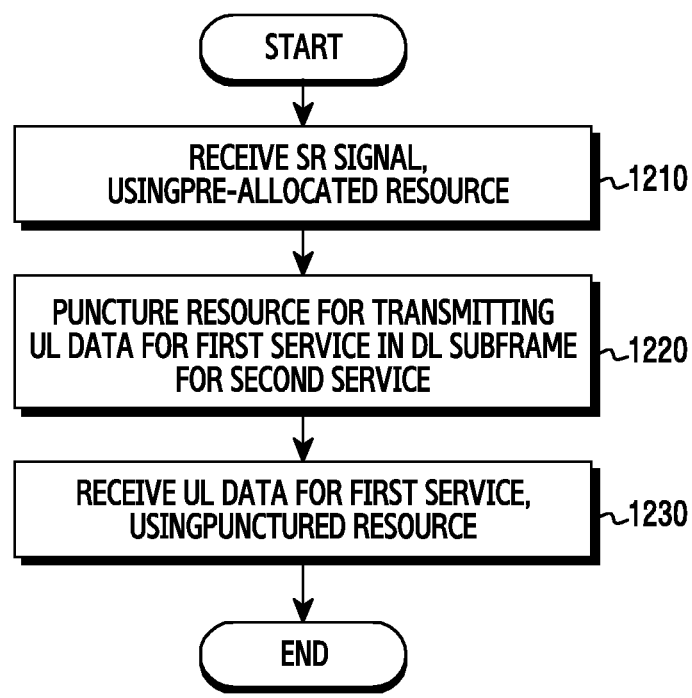
FIG. 12 illustrates operation flow of a base station for transmitting UL data for a first service in a DL subframe configured for a second service according to the second embodiment of the disclosure.

FIG. 12 illustrates operation flow of a base station for transmitting UL data for a first service in a DL subframe configured for a second service according to the second embodiment of the disclosure. FIG. 12 illustrates operation flow of the base station 110.

Referring to FIG. 12, in operation 1210, the base station 110 receives an SR signal from the terminal 120 by using a pre-allocated resource. The pre-allocated resource includes a resource allocated in a self-contained subframe.

In operation 1220, the base station 110 punctures a resource for the terminal 120 to transmit UL data for the first service in the DL subframe for the second service. The puncturing is determined based on a TTI required for the first service and the size of the UL data. The base station 110 has no time to transmit information about the punctured resource to the terminal 120 or the terminal 130, so it does not transmit the information about the punctured resource.

In operation 1230, the base station 110 receives UL data for the first service from the terminal 120 by using the punctured resource. The terminal 120 can recognize the location of the punctured resource by performing LBT.

Figure 13A:
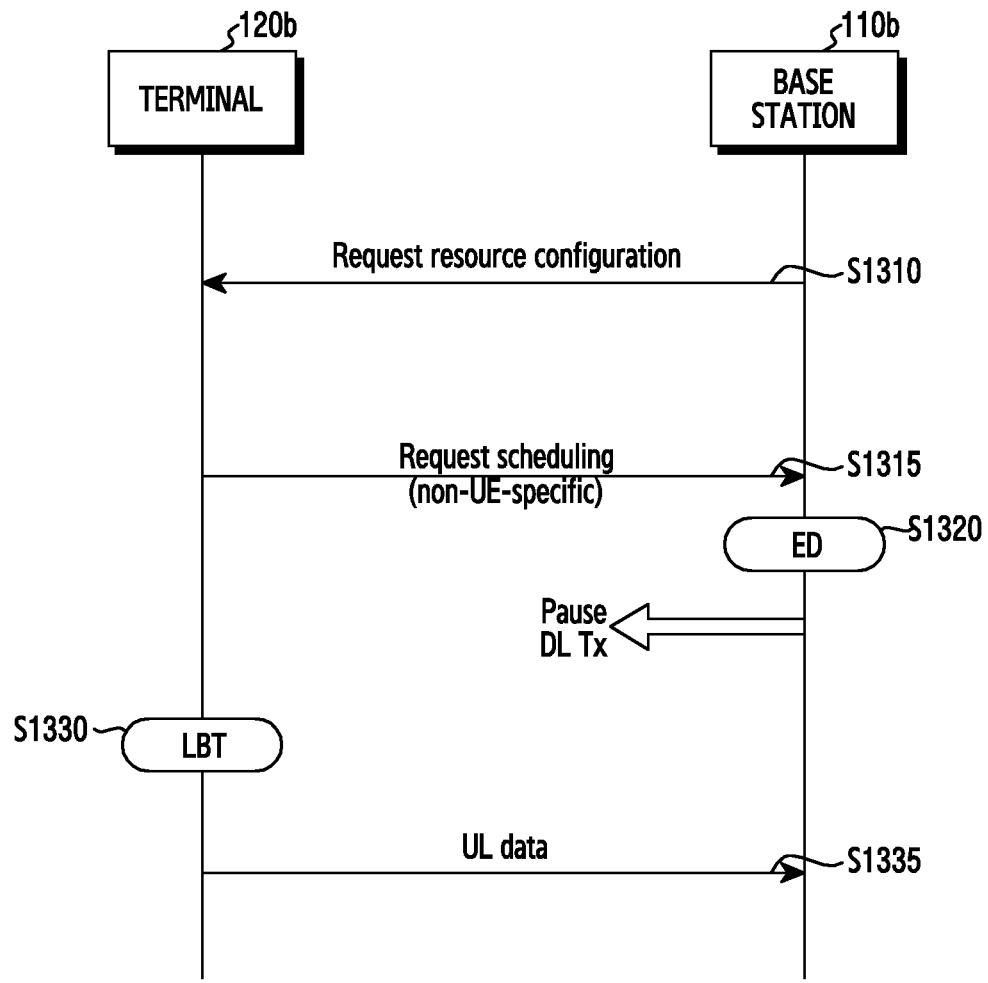
FIGS. 13A, 13B, and 13C illustrate a signal flow and resource allocation operation for transmitting UL data for a first service in a DL subframe configured for a second service according to the second embodiment of the disclosure.
Figure 13B:
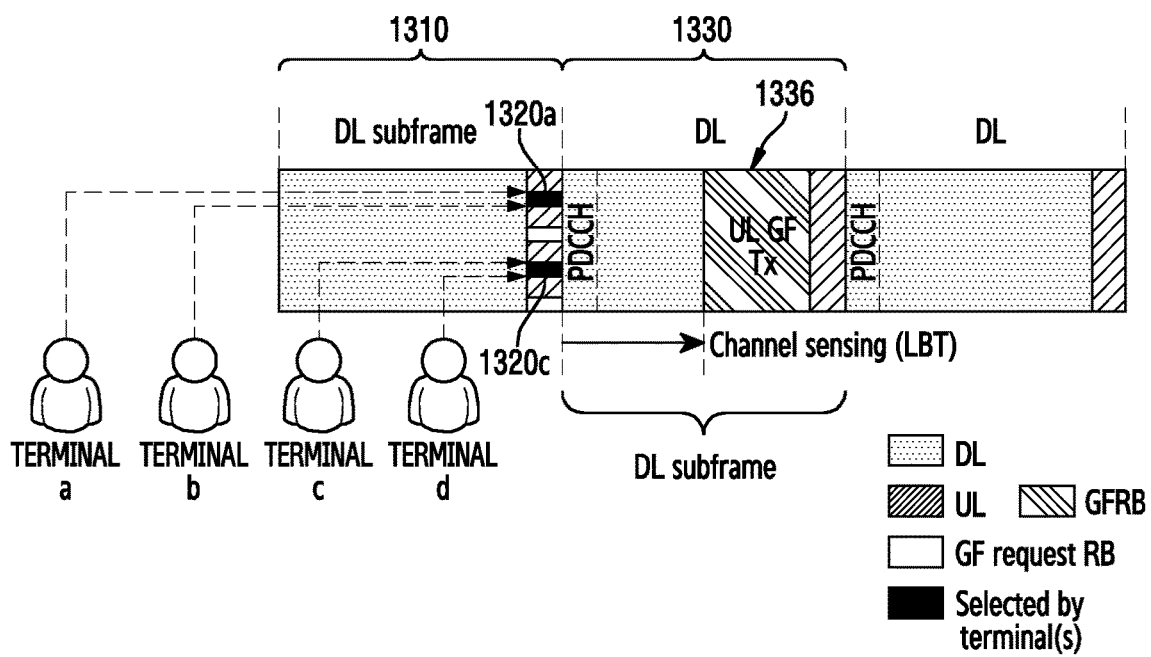
Figure 13C:
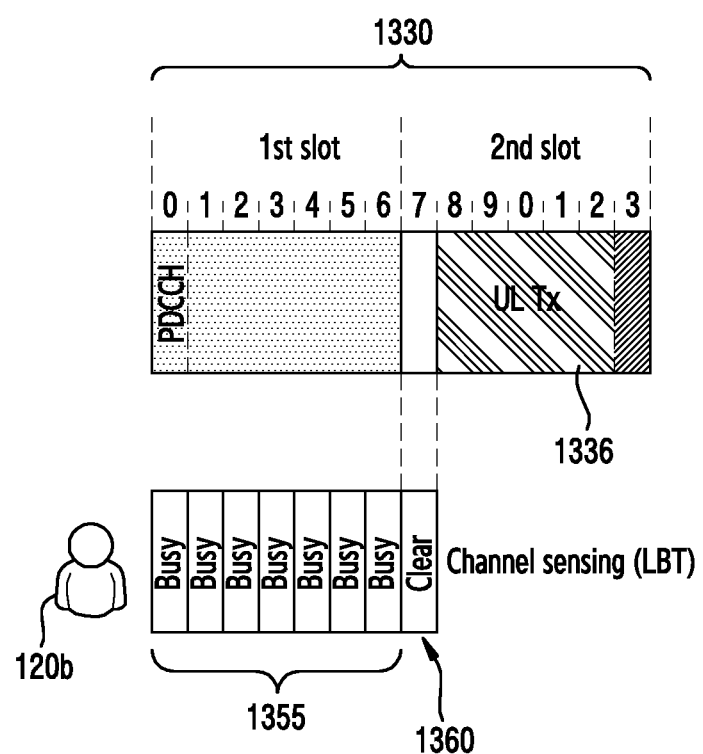

FIGS. 13A, 13B, and 13C illustrate a signal flow and resource allocation for transmitting UL data for a first service in a DL subframe configured for a second service according to the second embodiment of the disclosure. In the following description, it is assumed that a terminal 120b is a terminal that uses the first service (that is, a service using a short TTI) and a terminal 130b is a terminal that uses the second service (that is, a service using a normal TTI).

Referring to FIG. 13A, in operation S1310, the base station 110b transmits request resource configuration information to the terminal 120b. The request resource configuration information corresponds to request resource configuration information requested in operation S910 in FIG. 9A. Accordingly, the request resource configuration can be called a GF request resource configuration and is not specified to a terminal (non-UE-specific). For example, the request resource configuration can be allocated in a cell-specific method.

When UL data for the first service is generated, the terminal 120b transmits an SR signal to the base station 110b in operation S1315. The SR signal may be an LAA reservation signal or an SRS. The SR signal is transmitted based on the request resource configuration that the terminal 120b received from the base station 110b in operation S1310.

Referring to FIG. 13B, a terminal 'a' and a terminal 'b' can transmit SR signals by using an RB 1320a of a plurality of RBs allocated in a DL subframe 1310, and a terminal 'c' and a terminal 'd' can transmit SR signals by using an RB 1320c.

In operation S1320, the base station 110b performs ED on pre-allocated resources for SR signals. In other words, the base station 110b determines whether energy is sensed in order to determine whether signals have been transmitted from resources indicated by the request resource configuration. When the intensities of power measured at the resources are a predetermined threshold or more, the base station 110b determines that SR signals have been transmitted through the corresponding resources and allocates a resource for UL data transmission. For example, referring to FIG. 13B, the base station 110b can determine an UL transmission resource 1336 as an UL data transmission resource in a DL subframe 1330 based on a TTI for the first service.

In this embodiment of the disclosure, the base station 110a can determine that information about the UL data transmission resource has not been transmitted based on a data processing time that the terminal 120b can perform or the priority of a data resource for the second service. In other words, the base station 110b has no time to transmit information about the location and size of the determined UL transmission resource 1336 to the terminal 120b, so transmission of information about the punctured resource pauses.

In operation S1330, the terminal 120b performs LBT. For example, referring to FIG. 13B, terminals 'a', 'b', 'c', and 'd' (or the terminal 120b) can sense a channel in order to determine whether DL data has been transmitted from the DL subframe 1330 after the DL subframe 1310 used for transmitting an SR signal. The terminals 'a', 'b', 'c', and 'd' (or the terminal 120b) performs LBT in the unit of symbols constituting the DL subframe 1330.

Referring to FIG. 13C, the terminal 120b can determine a traffic state of each of the symbols included in the DL subframe 1330. When sensing that DL data transmission is performed ('Busy') from the symbols 1355 included in the first slot, the terminal 120b does not transmit the UL data in the symbols 1355. When sensing that DL data transmission is not performed ('Clear') from a symbol 1360 that is the first symbol of the second slot, the terminal 120b transmits UL data for the first service from the resource (that is, an UL transmission resource 1336) after the symbol 1360 in operation S1335 in FIG. 13A.

According to the embodiments described above, the terminal 120b can request a resource for the first service to the base station 110b and transmit UL data for the first service through the punctured resource. When another terminal (for example, the terminal 130) provided with the second service attempts to receive data through the punctured resource, a reception error is determined and a NACK is transmitted. Accordingly, an embodiment that provides information about a resource punctured for the first service to another terminal (for example, the terminal 130) provided with the second service in order to prevent unnecessary determination of an error and NACK feedback is described hereafter.

Figure 14A:
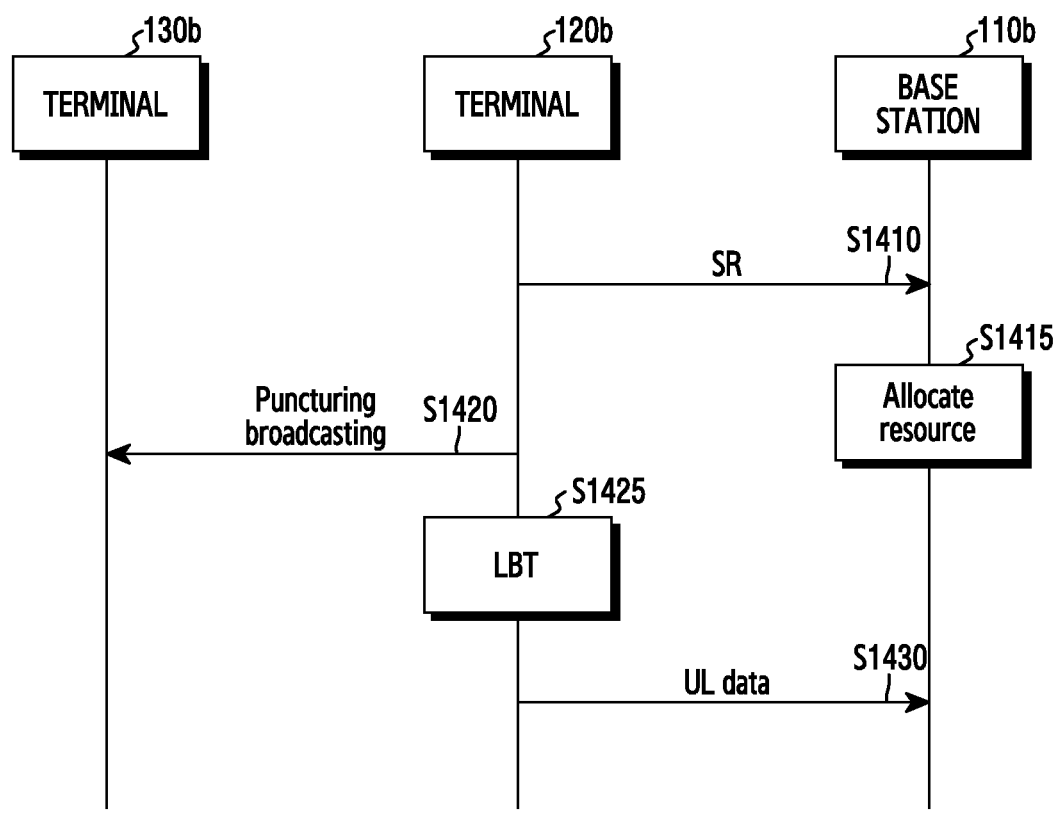
FIGS. 14A and 14B illustrate an operation of broadcasting a signal, which illustrates use of the first service, according to the second embodiment of the disclosure.
Figure 14B:
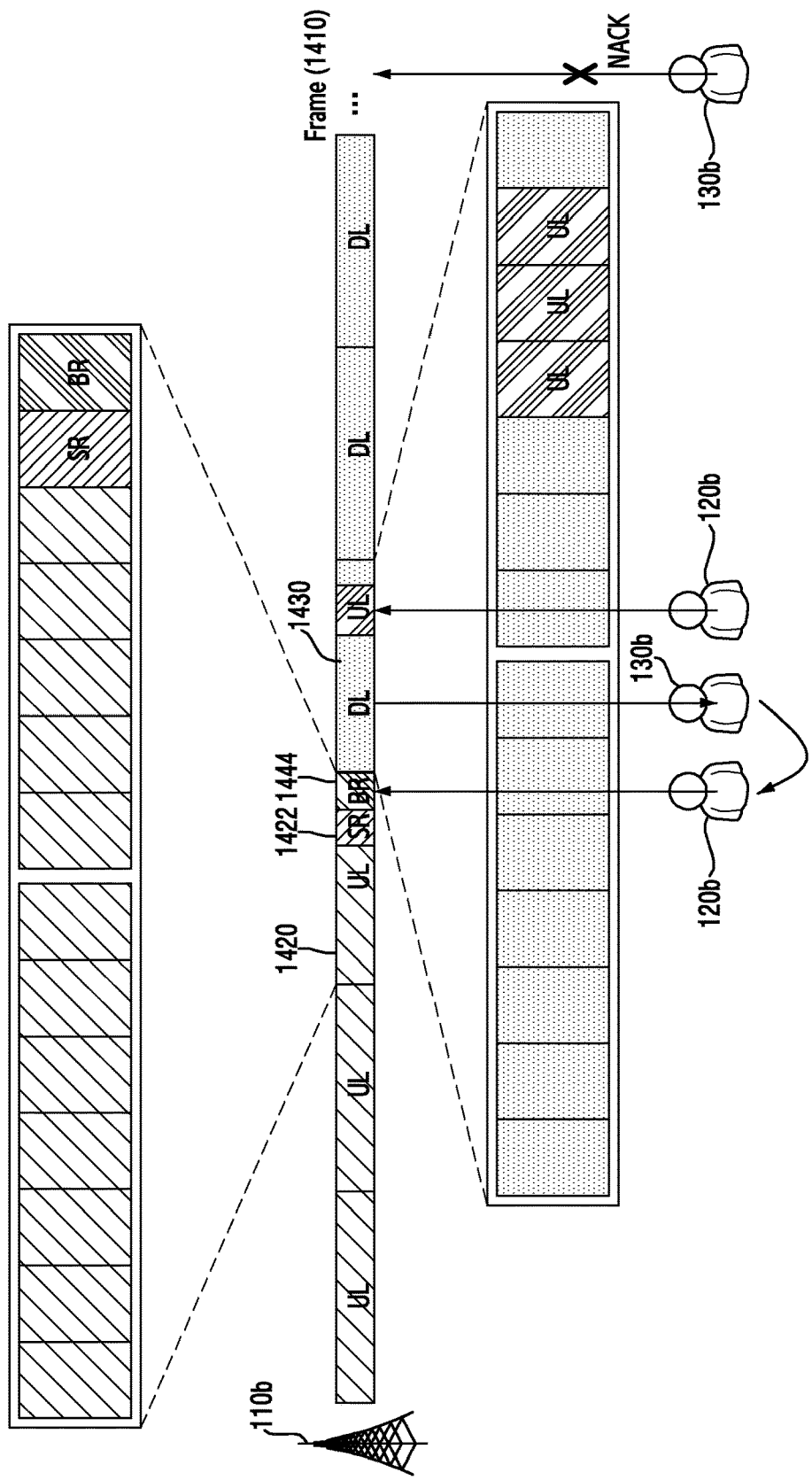

FIGS. 14A and 14B illustrate an operation of broadcasting a signal, which illustrates use of the first service, according to the second embodiment of the disclosure.

Referring to FIG. 14A, when UL data for the first service is generated, the terminal 120b transmits an SR signal to the base station 110b in operation S1410. The SR signal may be transmitted using a symbol included in a subframe. For example, referring to FIG. 14B, the terminal 120b can transmit an SR signal to the base station 110b by using a symbol 1422 included in an UL subframe 1420. FIG. 14B illustrates that the terminal 120b transmits an SR signal by using a symbol included in an UL subframe, but as shown in FIG. 13A, the terminal 120b may transmit the SR signal by using a self-contained subframe included in a DL subframe.

In operation S1415, the base station 110b determines a resource for UL data transmission based on the received SR signal. The UL data transmission resource can be determined based on the TTI applied to the first service.

Referring to FIG. 14B, a frame 1410 can be configured for the second service between the base station 110b and the terminal 130b. The base station 110b can allocate a resource to the terminal 120b by puncturing a resource included in a DL subframe 1430. The base station 110b has no time to transmit information about the punctured resource, it does not transmit the information about the punctured resource.

In operation S1420, the terminal 120b broadcasts information indicating that it will transmit UL data for the first service. The broadcasted signal can be transmitted in a symbol 1444 after the symbol 1422. A terminal 130b can recognize that another terminal will transmit the UL data by receiving the broadcasted information. Further, the terminal 130b can estimate the location and size of a resource punctured in the DL subframe for the second service based on the TTI for the first service and the size of UL data included in the broadcasted information.

In operation S1425, the terminal 120b performs LBT. For example, referring to FIG. 14B, the terminal 120b can determine traffic of DL data by sensing a channel corresponding to the DL subframe 1430 after transmitting an SR signal in the UL subframe 1420. When transmission of the DL data is not sensed, the terminal 120b transmits UL data by using the punctured resource in operation S1430. The terminal 130b does not receive DL data from the base station 110b in the punctured period. In this case, the terminal 130b does not transmit a specific NACK signal. Further, the terminal 130b can receive data corresponding to the punctured resource in a DL subframe after the DL subframe 1430.

Scenario 2: When DL Data for First Service is Multiplexed in UL Subframe Configured for Second Service FIG. 15 illustrates data collision when DL data for a first service is transmitted in an UL subframe configured for a second service in a wireless communication system according to various embodiments of the disclosure.

Figure 15:
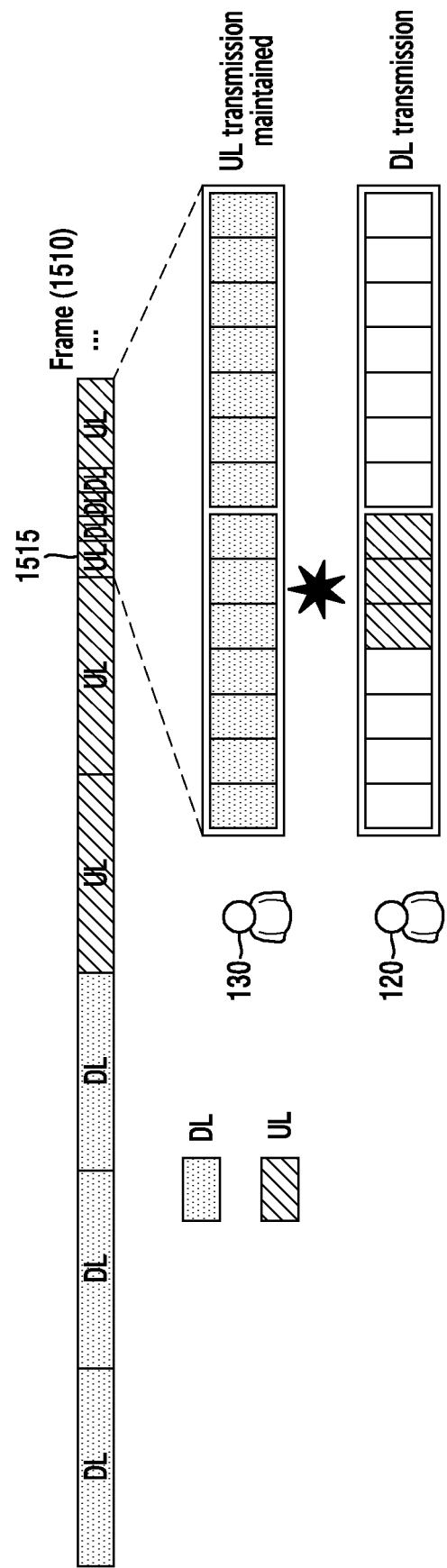
FIG. 15 illustrates data collision when DL data for a first service is transmitted in an UL subframe configured for a second service in a wireless communication system according to various embodiments of the disclosure.

Referring to FIG. 15, a frame 1510 is configured in advance for the second service between the base station 110 and the terminal 130. The frame 1510 includes a plurality of UL subframes for transmitting/receiving UL data and a plurality of DL subframes for transmitting/receiving DL data. While the second service between the base station 110 and the terminal 130 is provided, a situation in which the base station 110 transmits DL data for the first service may be urgently generated. In this case, the base station 110 can transmit the generated DL data to the terminal 120 in an UL subframe 1515. In other words, the base station 110 can multiplex a DL subframe in an UL subframe 1515 configured for the second service. According to this method, the base station 110 can quickly transmit the urgently generated DL data to the terminal 120. However, when UL transmission between the base station 110 and the terminal 130 is maintained in the UL subframe 1515, collision or interference may be generated between the UL data transmitted by the terminal 130 and the DL data transmitted by the base station 110.

Hereafter, the disclosure proposes an embodiment that can reduce interference between the DL data for the first service and the UL data for the second service in the scenario 2, with reference to FIGS. 16 to 19. The base station 110 and the terminal 120 can perform operations according to two situations. First, it can be assumed that the base station 110 can inform the terminal 120 and the terminal 130 of allocated resource information (hereafter, third embodiment). Second, it can be assumed that the base station 110 cannot inform the terminal 120 and the terminal 130 of allocated resource information (hereafter, fourth embodiment).

Figure 16:
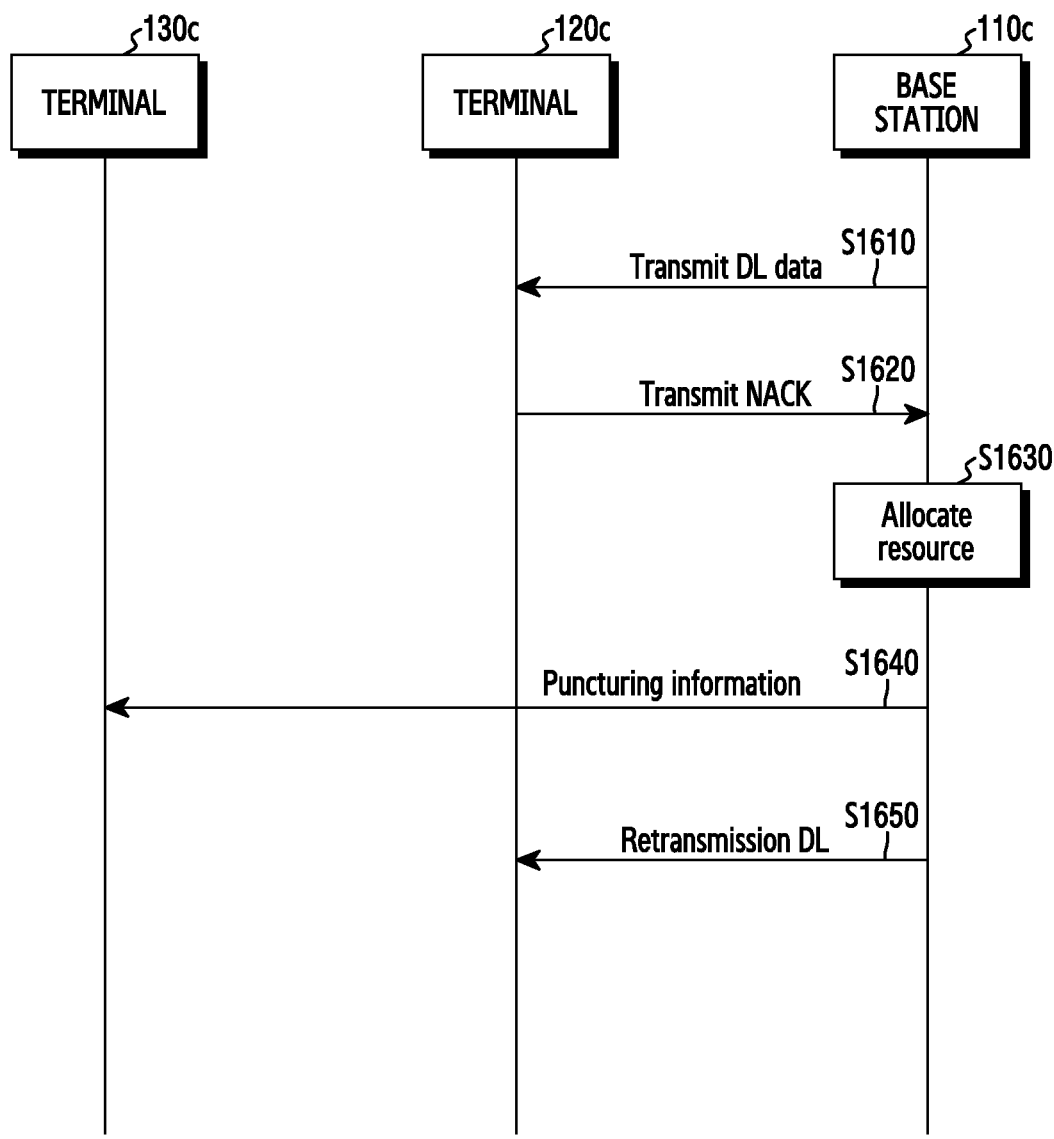
FIG. 16 illustrates flow of a signal for transmitting DL data for a first service in an UL subframe configured for a second service according to a third embodiment of the disclosure.

Third Embodiment: When Base Station Can Give Notice of Allocated Resource Information FIG. 16 illustrates flow of a signal for transmitting DL data for a first service in an UL subframe configured for a second service according to the third embodiment of the disclosure. In the following description, it is assumed that a terminal 120c is a terminal that uses the first service (that is, a service using a short TTI) and a terminal 130c is a terminal that uses the second service (that is, a service using a normal TTI).

Referring to FIG. 16, in operation S1610, a base station 110c transmits DL data for the first service to the terminal 120c in an UL subframe configured for the second service. In the UL subframe in which the DL data is transmitted, the terminal 130c still transmits UL data for the second service, so interference may be generated between the data for the first service and the data for the second service. The terminal 120c may not receive DL data from the base station 110c or may not normally decode received DL data due to the interference.

In operation S1620, the terminal 120c transmits a NACK signal indicating that the DL data was not normally received to the base station 110c. The terminal 120c can transmit the NACK signal by using a self-contained subframe determined in the procedure of setting RRC connection for the second service. In this case, interference between the NACK signal and the UL data transmitted from the terminal 130c can be reduced.

In operation S1630, the base station 110c allocates a resource for retransmitting DL data for the first service based on the received NACK signal. In other words, the base station 110c punctures an UL resource such that the DL data can be transmitted in the UL subframe for the second service. The allocated DL data transmission resource is allocated based on the size and TTI of DL data to be transmitted by the base station 110c.

In operation S1640, the base station 110c transmits information about the punctured resource to the terminal 130c. The base station 110c can transmit the information about the punctured resource by using the self-contained subframe. The terminal 130c does not transmit UL data in the period shown by the received information.

In operation S1650, the base station 110c transmits DL data for the first service to the terminal 120c based on the punctured resource.

Figure 17:
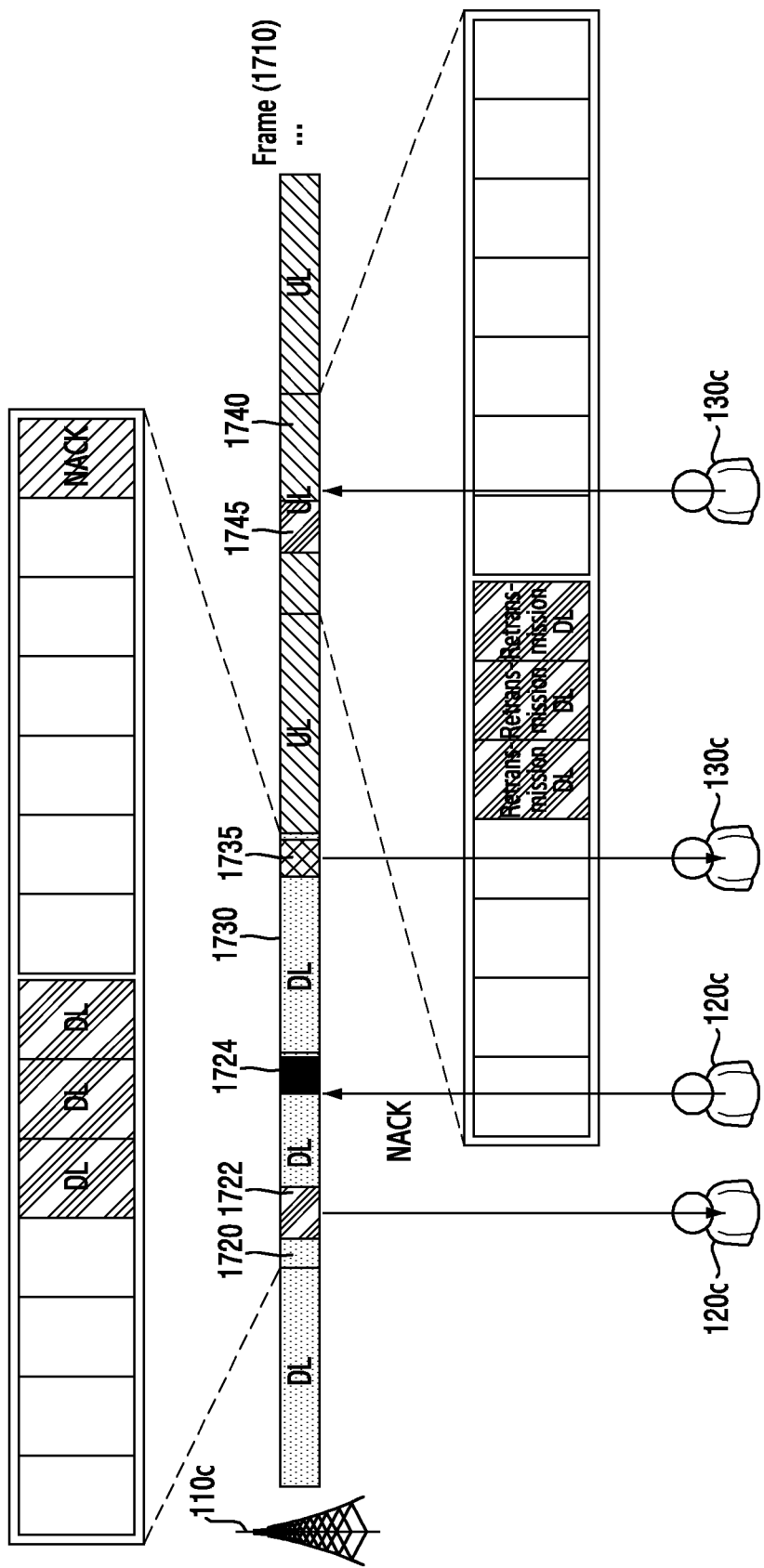
FIG. 17 illustrates an operation of transmitting DL data for a first service in a UL subframe configured for a second service according to the third embodiment of the disclosure.

FIG. 17 illustrates an operation of transmitting DL data for a first service in a UL subframe configured for a second service according to the third embodiment of the disclosure.

Referring to FIG. 17, a frame 1710 for the second service between the BS 110c and the terminal 130c is configured in advance. The frame 1710 includes a plurality of UL subframes and a plurality of DL subframes. The subframes each include a plurality of symbols. For example, as shown in FIG. 15, one subframe may include fourteen symbols.

When DL data for the first service is generated, the base station 110c can transmit DL data to the terminal 120c by using a portion of a DL subframe 1720. FIG. 17 illustrates that the base station 110c transmits the DL data by using a portion of a DL subframe, but the base station 110c may transmit the DL data by using a portion of an UL subframe configured in advance. The size of a resource that is used for transmitting the DL data may be determined based on the size of the DL data. For example, the base station 110c can transmit DL data by using three symbols 1722 included in the DL subframe 1720. The transmitted DL data may collide with other DL data transmitted for the first service. In this case, the terminal 120c transmits a NACK signal by using an UL transmission resource 1724 included in a self-contained subframe 1720.

The base station 110c allocates a resource for retransmitting the DL data based on the received NACK signal. The base station 110c allocates the resource based on the size of the DL data to be retransmitted and the TTI required for the first service. For example, the base station 110c can determine three symbols 1745, which are a portion of the UL subframe 1740, as resources for transmitting the DL data.

The base station 110c transmits information about the allocated resource to the terminal 130c by using symbols 1735 included in a DL subframe 1730. The information about the allocated resource can be transmitted using a PDCCH. The terminal 130c does not transmit UL data in three symbols 1745 included in the UL subframe 1540 based on the received information.

Figure 18:
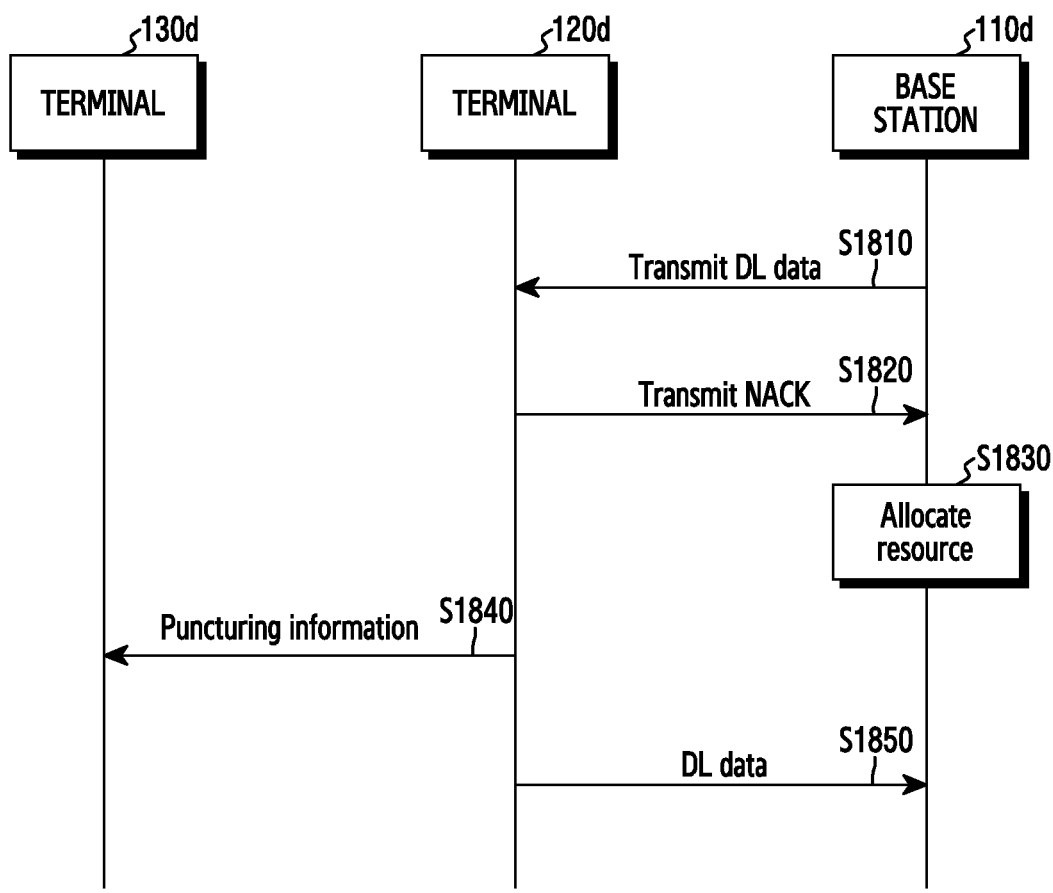
FIG. 18 illustrates flow of a signal for transmitting DL data for a first service in an UL subframe configured for a second service according to a fourth embodiment of the disclosure.

Fourth Embodiment: When Base Station Cannot Give Notice of Allocated Resource Information FIG. 18 illustrates flow of a signal for transmitting DL data for a first service in an UL subframe configured for a second service according to a fourth embodiment of the disclosure. In the following description, it is assumed that a terminal 120d is a terminal that uses the first service (that is, a service using a short TTI) and a terminal 130d is a terminal that uses the second service (that is, a service using a normal TTI).

Referring to FIG. 18, in operation S1810, a base station 110d transmits DL data for the first service to the terminal 120d in an UL subframe configured for the second service. The terminal 120d may not receive DL data from the base station 110d or may not normally decode received DL data due to interference generated from other data transmitted/received while the second service is provided.

In operation S1820, the terminal 120d transmits a NACK signal indicating that the DL data was not normally received to the base station 110d. For example, the terminal 120d can transmit the NACK signal by using a self-contained subframe.

In operation S1830, the base station 110d allocates a resource for retransmitting DL data for the first service based on the received NACK signal. In other words, the base station 110d punctures an UL resource such that the DL data can be transmitted in the UL subframe for the second service. The allocated DL data retransmission resource is allocated based on the size and TTI of DL data to be transmitted by the base station 110d.

In operation S1840, the terminal 120d broadcasts a signal indicating that the first service will be used. The broadcasted signal includes at least one or the size of DL data retransmitted from the base station 110*d* and the location information of the resource in which the DL data is transmitted. The terminal 130*d* can determine a period in which UL data for the second service is not transmitted, based on the broadcasted signal.

In operation S1850, the base station 110*d* transmits DL data for the first service to the terminal 120*d* based on the allocated resource.

Figure 19:
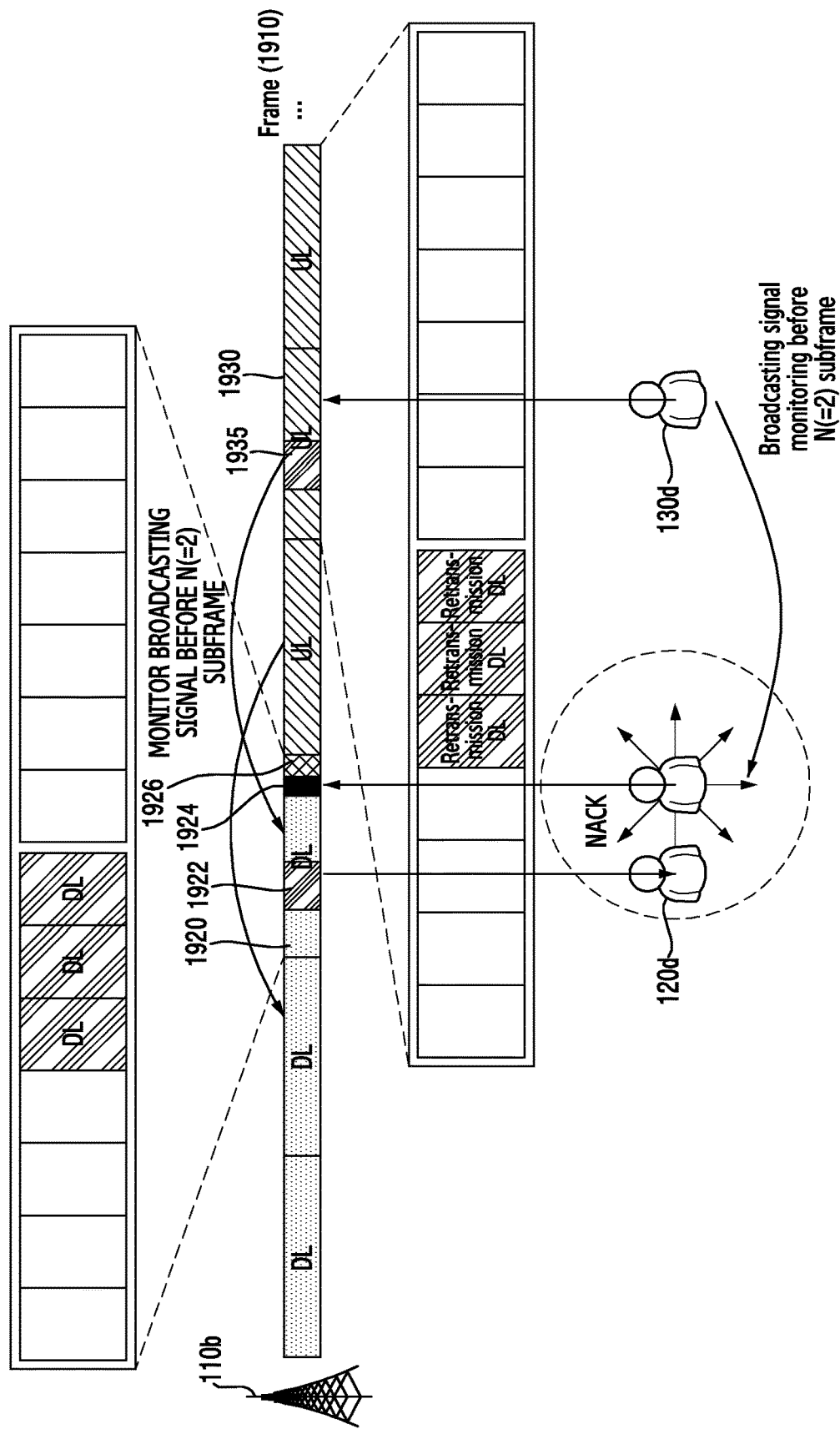
FIG. 19 illustrates an operation of transmitting DL data for a first service in a UL subframe configured for a second service according to the fourth embodiment of the disclosure.

FIG. 19 illustrates an operation of transmitting DL data for a first service in a UL subframe configured for a second service according to the fourth embodiment of the disclosure.

Referring to FIG. 19, a frame 1910 for the second service between the BS 110*d* and the terminal 130*d* is configured in advance. The frame 1910 includes a plurality of UL subframes and a plurality of DL subframes. The subframes each include a plurality of symbols. For example, as shown in FIG. 19, one subframe may include fourteen symbols.

When DL data for the first service is generated, the base station 110*d* can transmit DL data to the terminal 120*d* by using a portion of a DL subframe 1920. FIG. 19 illustrates that the base station 110*d* transmits the DL data by using a portion of a DL subframe, but the base station 110*d* may transmit the DL data by using a portion of an UL subframe configured in advance. The size of a resource that is used for transmitting the DL data may be determined based on the size of the DL data. For example, the base station 110*d* can transmit DL data by using three symbols 1922 included in the DL subframe 1920. The transmitted DL data may collide with other DL data transmitted for the first service. In this case, the terminal 120*d* transmits a NACK signal to the base station 110*d* by using an UL transmission resource 1924 included in a self-contained subframe 1920.

The terminal 120*d* broadcasts the NACK signal in a symbol 1926 that is next to the symbol in which the NACK signal was transmitted. The broadcasted signal includes at least one or the size of DL data retransmitted from the base station 110*d* and the location information of the resource in which the DL data is transmitted. The terminal 130*d* can recognize that DL data for the first service will be transmitted, by receiving the broadcasted signal. The terminal 130*d* does not transmit UL data in a symbol 1935 included in the UL subframe 1930 based on the size of the DL data included in the broadcasted signal and the location information of the resource in which the DL data is transmitted.

The base station 110*d* allocates a resource for retransmitting the DL data based on the received NACK signal. The base station 110*d* allocates the resource based on the size of the DL data to be retransmitted and the TTI required for the first service. For example, the base station 110*d* can determine three symbols 1935, which are a portion of the UL subframe 1930, as resources for transmitting the DL data.

The base station 110*d* has no time to transmit information about the allocated resource to the terminal 130*d*, so the base station 110*d* does not transmit specific information and transmits DL data for the first service to the terminal 120*d* by using the symbols 1935.

Methods according to embodiments stated in claims and/or specifications of the disclosure may be implemented in hardware, software, or a combination of hardware and software.

Certain aspects of the present disclosure can also be embodied as computer readable code on a non-transitory computer readable recording medium. A non-transitory computer readable recording medium is any data storage device that can store data which can be thereafter read by a computer system. Examples of the non-transitory computer readable recording medium include a Read-Only Memory (ROM), a Random-Access Memory (RAM), Compact Disc-ROMs (CD-ROMs), magnetic tapes, floppy disks, and optical data storage devices. The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

At this point it should be noted that the various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include a ROM, a RAM, CD-ROMs, magnetic tapes, floppy disks, and optical data storage devices. The processor readable mediums can also be distributed over network coupled computer systems so that the instructions are stored and executed in a distributed fashion. In addition, functional computer programs, instructions, and instruction segments for accomplishing the present disclosure can be easily construed by programmers skilled in the art to which the present disclosure pertains.

The programs (software modules or software) may be stored in non-volatile memories including a random access memory and a flash memory, a read only memory (ROM), an electrically erasable programmable ROM (EEPROM), a magnetic disc storage device, a compact disc-ROM (CD-ROM), digital versatile discs (DVDs), or other type optical storage devices, or a magnetic cassette. Alternatively, any combination of some or all of the may form a memory in which the program is stored. Further, a plurality of such memories may be included in the electronic device.

In addition, the programs may be stored in an attachable storage device which is accessible through communication networks, such as the Internet, Intranet, local area network (LAN), wide area network (WAN), and storage area network (SAN), or a combination thereof. Such a storage device may access the electronic device via an external port. Further, a separate storage device on the communication network may access a portable electronic device.

In the above-described detailed embodiments of the disclosure, a component included in the disclosure is expressed in the singular or the plural according to a presented detailed embodiment. However, the singular form or plural form is selected for convenience of description suitable for the presented situation, and various embodiments of the disclosure are not limited to a single element or multiple elements thereof. Further, either multiple elements expressed in the description may be configured into a single element or a single element in the description may be configured into multiple elements.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method of operating a terminal in a wireless communication system, the method comprising:
   transmitting, to a base station, a scheduling request (SR) to transmit an uplink (UL) data for a first service; and
   transmitting, to the base station, the UL data through a resource punctured in a downlink (DL) resource for a second service allocated to another terminal,
   wherein the punctured resource is determined based on a time the SR is transmitted,
   wherein the punctured resource is indicated to the another terminal by information transmitted from at least one of the base station or the terminal before DL data for the second service mapped to the DL resource is received by the another terminal, and
   wherein the first service is associated with a transmission time interval (TTI) shorter than a TTI associated with the second service.

2. The method of claim 1, wherein the transmitting of the UL data comprises:
   sensing whether the base station transmits DL data in a DL subframe for the second service after transmitting the SR; and
   transmitting the UL data for the first service based on a determination that a transmission of DL data is not sensed in the DL subframe for the second service.

3. The method of claim 1, further comprising:
   transmitting, to the base station, a negative-acknowledgement (NACK) for a received DL data for the first service; and
   receiving, from the base station, a retransmission of the DL data for the first service through a resource punctured in a UL subframe for the second service.

4. The method of claim 3, further comprising broadcasting information indicating that the terminal is associated with the first service,
   wherein the broadcasted information includes information indicating a size of the DL data for the first service.

5. The method of claim 1,
   wherein the SR is transmitted on a pre-allocated resource, and
   wherein the pre-allocated resource comprises at least one of a resource indicated to the terminal from the base station, a resource determined by the base station in a procedure for setting a radio resource control (RRC) connection between the terminal and the base station, or a cell-specific resource.

6. A terminal apparatus in a wireless communication system, the terminal apparatus comprising:
   at least one processor; and
   a transceiver configured to:
      transmit, to a base station, a scheduling request (SR) to transmit an uplink (UL) data for a first service, and
      transmit, to the base station, the UL data through a resource punctured in a downlink (DL) resource for a second service allocated to another terminal,
   wherein the punctured resource is determined based on a time the SR is transmitted,
   wherein the punctured resource is indicated to the another terminal by information transmitted from at least one of the base station or the terminal before DL data for the second service mapped to the DL resource is received by the another terminal, and
   wherein the first service is associated with a transmission time interval (TTI) shorter than a TTI associated with the second service.

7. The terminal apparatus of claim 6, wherein the at least one processor is further configured to:
   sense whether the base station transmits DL data in a DL subframe for the second service after transmitting the SR, and
   transmit the UL data for the first service based on a determination that a transmission of DL data is not sensed in the DL subframe for the second service.

8. The terminal apparatus of claim 6, wherein the transceiver is further configured to:
   transmit, to the base station, a negative-acknowledgement (NACK) for a received DL data for the first service, and
   receive, from the base station, a retransmission of the DL data for the first service through a resource punctured in a UL subframe for the second service.

9. The terminal apparatus of claim 8,
   wherein the transceiver is further configured to broadcast information indicating that the terminal is associated with the first service, and
   wherein the broadcasted information includes information indicating a size of the DL data for the first service.

10. The terminal apparatus of claim 6,
    wherein the SR is transmitted on a pre-allocated resource, and
    wherein the pre-allocated resource comprises at least one of a resource indicated to the terminal from the base station, a resource determined by the base station in a procedure for setting a radio resource control (RRC) connection between the terminal and the base station, or a cell-specific resource.

11. A base station apparatus in a wireless communication system, the base station apparatus comprising:
    at least one processor; and
    a transceiver configured to:
       receive, from a terminal, a scheduling request (SR) to transmit an uplink (UL) data for a first service, and
       receive, from the terminal, the UL data through a resource punctured in a downlink (DL) resource for a second service allocated to another terminal,
    wherein the punctured resource is determined based on a time the SR is transmitted,
    wherein the punctured resource is indicated to the another terminal by information transmitted from at least one of the base station or the terminal before DL data for the second service mapped to the DL resource is received by the another terminal, and
    wherein the first service is associated with a transmission time interval (TTI) shorter than a TTI associated with the second service.

12. The base station apparatus of claim 11,
    wherein the SR is transmitted on a pre-allocated resource, and
    wherein the at least one processor is further configured to:
       determine whether a signal strength of a signal received through the pre-allocated resource exceeds or equal to a threshold, and
       puncture the resource based on a determination that the signal strength exceeds or equal to the threshold.

13. The base station apparatus of claim 12, wherein the at least one processor is further configured to control the transceiver to transmit information indicating the pre-allocated resource.

14. The base station apparatus of claim 11,
wherein the transceiver is further configured to transmit, to the terminal, a response for the SR comprising information indicating the punctured resource, and
wherein the response includes an index of a cell-specific resource in which the SR is received.

15. The base station apparatus of claim 11, wherein the transceiver is further configured to:
receive, from the terminal, a negative-acknowledgement (NACK) for a received DL data for the first service, and
transmit, to the terminal, a retransmission of the DL data for the first service through a resource punctured in a UL subframe for the second service.

16. The base station apparatus of claim 11,
wherein the SR is transmitted on a pre-allocated resource, and
wherein the pre-allocated resource is determined by the base station in a procedure for setting radio resource control (RRC) connection between the terminal and the base station.

17. The base station apparatus of claim 16, wherein the pre-allocated resource comprises a cell-specific resource.

* * * * *

UNITED STATES PATENT AND TRADEMARK OFFICE
CERTIFICATE OF CORRECTION

PATENT NO.        : 10,524,247 B2
APPLICATION NO.   : 15/896672
DATED             : December 31, 2019
INVENTOR(S)       : Jung-min Moon et al.

Page 1 of 1

It is certified that error appears in the above-identified patent and that said Letters Patent is hereby corrected as shown below:

On the Title Page

Item (73), Line 3, add --Korea Advanced Institute of Science and Technology, Daejeon (KR)--

Signed and Sealed this
Thirtieth Day of June, 2020

Andrei Iancu
*Director of the United States Patent and Trademark Office*